(12) United States Patent
Long

(10) Patent No.: US 11,225,881 B2
(45) Date of Patent: Jan. 18, 2022

(54) HYBRID PROPULSION SYSTEMS

(71) Applicant: Rolls-Royce North American Technologies, Inc., Indianapolis, IN (US)

(72) Inventor: Stephen Andrew Long, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 233 days.

(21) Appl. No.: 16/184,725

(22) Filed: Nov. 8, 2018

(65) Prior Publication Data

US 2020/0149427 A1    May 14, 2020

(51) Int. Cl.
*B64D 27/24* (2006.01)
*F01D 15/10* (2006.01)
(Continued)

(52) U.S. Cl.
CPC ............... *F01D 15/10* (2013.01); *F02K 3/04* (2013.01); *B64D 27/14* (2013.01); *B64D 27/24* (2013.01);
(Continued)

(58) Field of Classification Search
CPC .. B64D 2027/026; B64D 27/24; B64D 27/02; B64D 2221/00; B64C 2201/042;
(Continued)

(56) References Cited

U.S. PATENT DOCUMENTS

| 6,344,700 B1 | 2/2002 | Eisenhauer et al. |
| 9,194,285 B2 | 11/2015 | Botti et al. |

(Continued)

FOREIGN PATENT DOCUMENTS

| CA | 3038299 A1 | 4/2018 |
| DE | 102010021026 A1 | 11/2011 |

(Continued)

OTHER PUBLICATIONS

Knapp et al., "Zunum Aero's Hybrid Electric Airplane Aims to Rejuvenate Regional Travel," IEEE Spectrum, Apr. 26, 2018, 4 pp.

(Continued)

*Primary Examiner* — Todd E Manahan
*Assistant Examiner* — Rene D Ford
(74) *Attorney, Agent, or Firm* — Shumaker & Sieffert, P.A.

(57) ABSTRACT

An example hybrid aircraft propulsion system includes one or more parallel propulsion units, each of the parallel propulsion units comprising: a first propulsor; a gas turbine engine configured to drive the first propulsor; and an electrical machine selectively configurable to: generate, for output via one or more electrical busses, electrical energy using mechanical energy derived from the first propulsor or the gas turbine engine; and drive the first propulsor using electrical energy received via the one or more electrical busses; and one or more series propulsion units, each of the series propulsion units comprising: a second propulsor; and an electrical machine selectively configurable to: generate, for output via the one or more electrical busses, electrical energy using mechanical energy derived from the second propulsor or the gas turbine engine; and drive the second propulsor using electrical energy received from one or more electrical busses.

14 Claims, 8 Drawing Sheets

(51) Int. Cl.
*F02K 3/04* (2006.01)
*B64D 27/14* (2006.01)
*B64D 27/02* (2006.01)

(52) U.S. Cl.
CPC .. *B64D 2027/026* (2013.01); *F05D 2220/323* (2013.01); *F05D 2220/762* (2013.01)

(58) Field of Classification Search
CPC ........ B60L 2200/10; F01D 15/10; F02K 3/04; F05D 2220/323; F05D 2220/762; Y02T 50/60; Y02T 50/40
See application file for complete search history.

(56) References Cited

U.S. PATENT DOCUMENTS

| | | | |
|---|---|---|---|
| 9,327,600 | B1 | 5/2016 | Nehmeh |
| 9,751,614 | B1 | 9/2017 | Nguyen et al. |
| 10,443,504 | B2 | 10/2019 | Dalal |
| 2008/0184906 | A1 | 8/2008 | Kejha |
| 2011/0210606 | A1 | 9/2011 | Selker et al. |
| 2012/0209456 | A1 | 8/2012 | Harmon et al. |
| 2013/0094963 | A1* | 4/2013 | Rolt ............... B64D 27/24 416/1 |
| 2013/0099065 | A1 | 4/2013 | Stuhlberger |
| 2014/0187107 | A1 | 7/2014 | Gemin et al. |
| 2015/0103457 | A1 | 4/2015 | Shander et al. |
| 2015/0144742 | A1 | 5/2015 | Moxon et al. |
| 2015/0285165 | A1 | 10/2015 | Steinwandel et al. |
| 2016/0004374 | A1 | 1/2016 | Kneuper et al. |
| 2016/0023773 | A1 | 1/2016 | Himmelmann et al. |
| 2016/0236790 | A1 | 8/2016 | Knapp et al. |
| 2017/0107910 | A1 | 4/2017 | Huang |
| 2017/0291712 | A1 | 10/2017 | Himmelmann et al. |
| 2017/0349293 | A1 | 12/2017 | Klemen et al. |
| 2018/0079515 | A1 | 3/2018 | Harwood et al. |
| 2018/0163558 | A1 | 6/2018 | Vondrell et al. |
| 2018/0201384 | A1* | 7/2018 | Barth ............... B64D 27/24 |
| 2019/0023389 | A1* | 1/2019 | Murrow ............ B64C 29/0016 |
| 2019/0256200 | A1 | 8/2019 | Neff |
| 2019/0263519 | A1 | 8/2019 | Argus |
| 2019/0322379 | A1 | 10/2019 | Mackin |
| 2020/0148372 | A1 | 5/2020 | Long |
| 2020/0148373 | A1 | 5/2020 | Long |
| 2020/0153252 | A1 | 5/2020 | Long |
| 2020/0164755 | A1 | 5/2020 | Smolenaers |

FOREIGN PATENT DOCUMENTS

| | | |
|---|---|---|
| EP | 3375713 A1 | 9/2018 |
| EP | 3388652 A1 | 10/2018 |
| EP | 3392148 A1 | 10/2018 |
| GB | 2574039 A | 11/2019 |
| WO | 0074964 A1 | 12/2000 |
| WO | 2017009037 A1 | 1/2017 |

OTHER PUBLICATIONS

Bradley et al. "Subsonic Ultra Green Aircraft Research: Phase I Final Report," NASA/CR-2011-216847, Apr. 2011, 207 pp.
Bradley et al. "Subsonic Ultra Green Aircraft Research: Phase II-vol. II-Hybrid Electric Design Exploration," NASA/CR-2015-218704, Apr. 2015, 233 pp.
Lents, "Parallel Hybrid Gas Electric Propulsion Design Space," United Technologies Research Center, Aug. 22, 2017, 13 pp.
Robinson, "How E-Fan X Will Jump-Start a New Era in Hybrid-Electric Flight," Royal Aeronautical Society, Dec. 1, 2017, 16 pp.
Extended Search Report from counterpart European Application No. 19201834.9, dated Mar. 11, 2020, 5 pp.
Perkon, "Hypstair #2 Newsletter," Hypstair, Oct. 30, 2015, 12 pp.
Response to Extended Search Report from counterpart European Application No. 19201834.9, dated Mar. 11, 2020, filed Oct. 16, 2020, 93 pp.
Examination Report from counterpart European Application No. 19201834.9, dated Feb. 22, 2021, 5 pp.
Response to Examination Report dated Feb. 22, 2021, from counterpart European Application No. 19201834.9, filed Jun. 2, 2021, 10 pp.
Examination Report from counterpart European Application No. 19201834.9, dated Oct. 1, 2021, 4 pp.

* cited by examiner

HYBRID PROPULSION SYSTEMS

TECHNICAL FIELD

This disclosure relates to hybrid propulsion systems.

BACKGROUND

A gas turbine engine is a type of internal combustion engine that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

SUMMARY

In general, this disclosure describes hybrid propulsion systems that enable vehicles to be propelled using combinations of electrical motors and combustion motors (e.g., thermodynamic engines such as gas turbine engines). As one example, in a series hybrid propulsion system, the combustion motors may provide mechanical energy to operate one or more electrical generators, and the electrical motors may utilize power generated by the electrical generators to operate one or more propulsors. As another example, in a parallel hybrid propulsion system, the combustion motors may provide mechanical energy to operate one or more electrical generators and one or more propulsors, and the electrical motors may utilize power generated by the electrical generators to operate the propulsors that are also operated by the combustion motors. As another example, in a series-parallel hybrid propulsion system, the combustion motors may provide mechanical energy to operate one or more electrical generators and one or more propulsors, a first set of the electrical motors may utilize power generated by the electrical generators to operate the propulsors that are also operated by the combustion motors, and a second set of the electrical motors may utilize power generated by the electrical generators to operate one or more propulsors that are different than the propulsors operated by the combustion motors.

In one example, an aircraft propulsion system includes: one or more parallel propulsion units, each of the parallel propulsion units comprising: a propulsor of a first set of propulsors; a gas turbine engine configured to drive the propulsor; and an electrical machine selectively configurable to: generate, for output via one or more electrical busses, electrical energy using mechanical energy derived from the propulsor or the gas turbine engine; and drive the propulsor of the first set of propulsors using electrical energy received via the one or more electrical busses; and one or more series propulsion units, each of the series propulsion units comprising: a propulsor of a second set of propulsors; and an electrical machine selectively configurable to: generate, for output via the one or more electrical busses, electrical energy using mechanical energy derived from the propulsor or the gas turbine engine; and drive the propulsor of the second set of propulsors using electrical energy received from one or more electrical busses.

In another example, a method of propelling an aircraft includes driving, by one or more parallel propulsion units of the aircraft, one or more propulsors of a first set of propulsors; outputting, by the one or more parallel propulsion units of the aircraft, electrical energy onto one or more electrical busses; and driving, by one or more series propulsion units of the aircraft and using electrical energy received via the one or more electrical busses, one or more propulsors of a second set of propulsors that is different than the first set of propulsors.

In another example, an airframe includes: one or more parallel propulsion units, each of the parallel propulsion units comprising: a propulsor of a first set of propulsors; a gas turbine engine configured to drive the propulsor; and an electrical machine selectively configurable to: generate, for output via one or more electrical busses, electrical energy using mechanical energy derived from the propulsor or the gas turbine engine; and drive the propulsor of the first set of propulsors using electrical energy received via the one or more electrical busses; and one or more series propulsion units, each of the series propulsion units comprising: a propulsor of a second set of propulsors; and an electrical machine selectively configurable to: generate, for output via the one or more electrical busses, electrical energy using mechanical energy derived from the propulsor or the gas turbine engine; and drive the propulsor of the second set of propulsors using electrical energy received from one or more electrical busses.

The details of one or more examples are set forth in the accompanying drawings and the description below. Other features, objects, and advantages will be apparent from the description and drawings, and from the claims.

DETAILED DESCRIPTION

Figure 1:
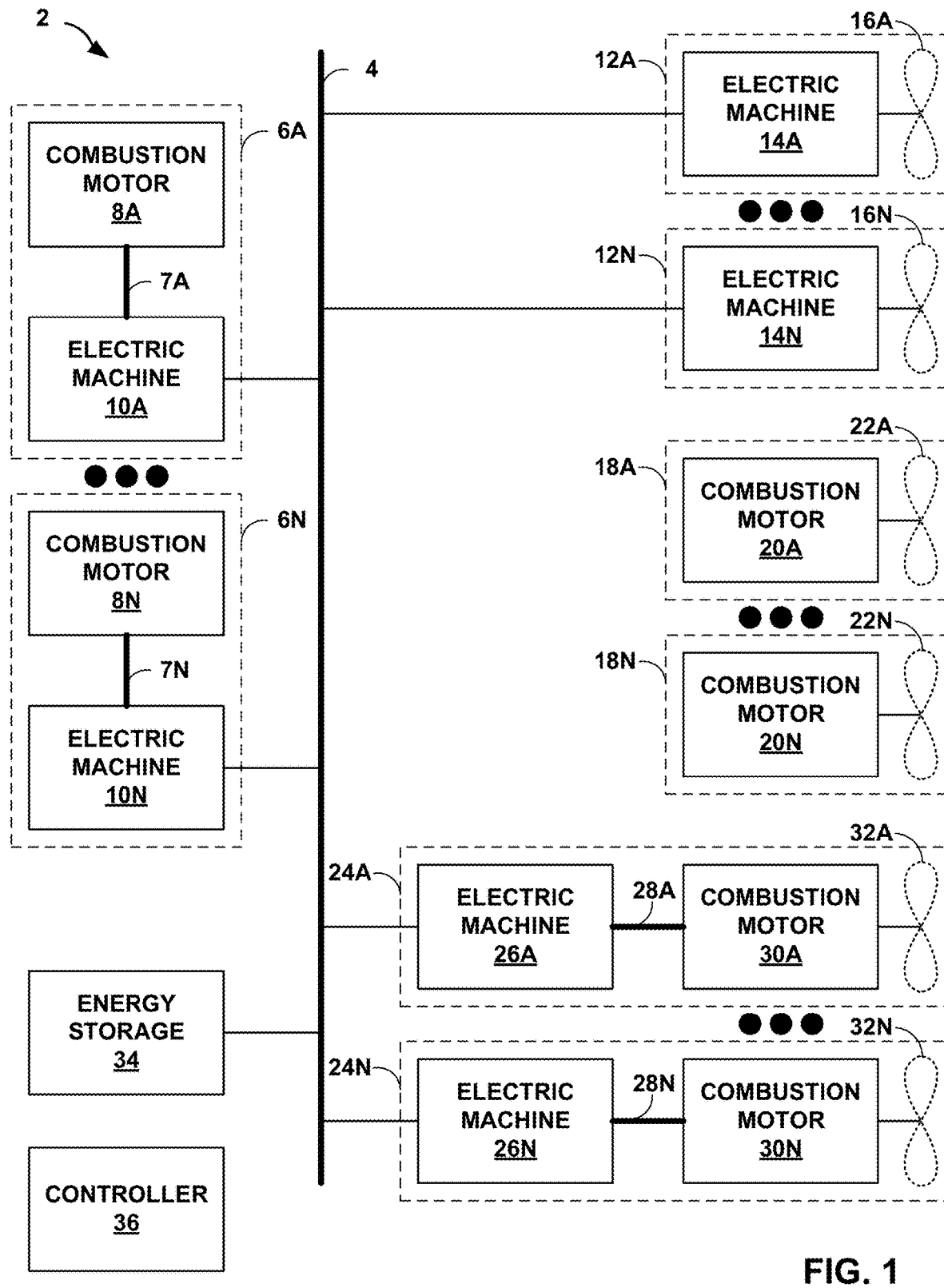
FIG. 1 is a conceptual block diagram illustrating a system that includes a hybrid propulsion system, in accordance with one or more techniques of this disclosure.

Vehicles may include combustion motors that convert chemical potential energy (e.g., fuel) to propulsion and/or to electrical power. In addition to combustion motors, vehicles may include electrical machines to create propulsion. A vehicle that includes both combustion motors and electrical machines may be referred to as a hybrid vehicle. The motors in hybrid vehicles may be configured as series, parallel, or series-parallel.

In a series configuration, the combustion motor(s) may not directly provide power to propulsors, but instead may provide power in the form of rotational mechanical energy to one or more electric generators. The generator(s) may provide electrical power to the electrical machine(s), which in turn provide power (i.e., rotational mechanical energy) to one or more propulsors. In some examples, a vehicle with motors in a series configuration may include an energy storage system (ESS) capable of storing electrical energy for subsequent use by the electrical machines. The ESS may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle. Some other components of the vehicle that may generate electrical energy include, but are not limited to, the electrical machines (e.g., in a descent phase of flight in the case of an aircraft), solar panels, and the like.

In a parallel configuration, the combustion motor(s) and the electrical machine(s) each may directly provide power to common propulsors. For instance, a combustion motor and an electrical machine may be configured to provide power (i.e., rotational mechanical energy) to a common propulsor. The electrical machine may provide the power to the propulsor using electrical power generated via the combustion motor (e.g., at a time when the electrical machine is not providing power to the propulsor), electrical power received from an ESS, or electrical power generated by another combustion motor. In this way, the electric machine may provide a "boost" of available power (e.g., for peak thrust operations). Similar to the ESS in the series configuration, the ESS in the parallel configuration may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle.

In a series-parallel configuration, the combustion motor(s) and the electrical machine(s) may directly provide power to propulsors. However, as opposed to the parallel configuration in which each propulsor is mechanically powered by at least a combustion motor, the series-parallel configuration includes at least one propulsor that is powered exclusively by one or more electrical machines. That is, the series-parallel configuration includes a first set of electrical machines configured to provide power to a first set of propulsors that are also directly powered by combustion motors and a second set of electrical machines configured to provide power to a second set of propulsors that are not directly powered by combustion motors. Similar to the ESS in the series and parallel configurations, the ESS in the series-parallel configuration may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle.

FIG. 1 is a conceptual block diagram illustrating a system 2 that includes a hybrid propulsion system, in accordance with one or more techniques of this disclosure. As shown in FIG. 1, system 2 includes an electrical bus 4, one or more power units 6A-6N (collectively, "power units 6"), one or more series propulsion modules 12A-12N (collectively, "series propulsion modules 12"), one or more non-hybrid propulsion modules 18A-18N (collectively, "non-hybrid propulsion modules 18"), one or more parallel propulsion modules 24A-24N (collectively, "parallel propulsion modules 24"), an energy storage system (ESS) 34, and a controller 36. System 2 may be included in, and provide propulsion to, any vehicle, such as an aircraft, a locomotive, or a watercraft. System 2 may include additional components not shown in FIG. 1 or may not include some components shown in FIG. 1.

Electrical bus 4 provides electrical power interconnection between various components of system 2. Electrical bus 4 may include any combination of one or more direct current (DC) bus, one or more alternating current (AC) electrical bus, or combinations thereof. As one example, electrical bus 4 may include a DC bus configured to transport electrical power between power units 6 and series propulsion modules 12. As another example, electrical bus 4 may include plurality of redundant DC buses configured to transport electrical power between power units 6 and series propulsion modules 12.

Power units 6 provide electrical power for use by various components of system 2. As shown in FIG. 1, each of power units 6 includes one or more combustion motors and one or more associated electrical machines. For instance, power unit 6A includes combustion motor 8A and electrical machine 10A, and power unit 6N includes combustion motor 8N and electrical machine 10N. In operation, combustion motor 8A utilizes consumes fuel to produce rotational mechanical energy, which may be provided to electric machine 10A via drive shaft 7A. Electric machine 10A converts the rotational mechanical energy into electrical energy and outputs the electrical energy to electrical bus 4. Each of the combustion motors included in power units 6 may be any type of combustion motor. Examples of combustion motors include, but are not limited to, reciprocating, rotary, and gas-turbines.

Each of power units 6 may have the same or different power generation capacities. As one example, when operating at peak power, power unit 6A may be capable of generating a greater amount of electrical power than power unit 6N. In this way, one or more of power units 6A-6N may be enabled, e.g., depending on a power demands of series propulsion modules 12, other components of system 2, or both. As another example, when operating at peak power, power unit 6A and power unit 6N may be capable of generating the same amount of electrical power.

Series propulsion modules 12 convert electrical energy to propulsion. As shown in FIG. 1, each of series propulsion modules 12 may include one or more electrical machines and one or more propulsors. For instance, series propulsion module 12A includes electrical machine 14A and propulsor 16A, and series propulsion module 12N includes electrical machine 14N and propulsor 16N. In operation, series propulsion modules 12 may operate in a plurality of modes including, but not limited to, an electric-only mode, a regeneration mode, and a neutral mode.

When series propulsion module 12A operates in the electric-only mode, electrical machine 14A may consume electrical energy received via electrical bus 4 and convert the electrical energy to rotational mechanical energy to power propulsor 16A. When series propulsion module 12A operates in the regeneration mode, electrical machine 14A converts rotational mechanical energy received from propulsor 16A into electrical energy, and provides the electrical energy to electrical bus 4. Electrical bus 4 may distribute the electrical energy to another one of series propulsion modules 12, one of parallel propulsion modules 24, ESS 34, or combinations thereof. When series propulsion module 12A operates in the neutral mode, propulsor 16A may "windmill" and/or reduce its fluid resistance (e.g., feather and/or blend with contours of an airframe).

Each of series propulsion modules 12 may have the same or different propulsion capacities. As one example, when operating at peak power, series propulsion module 12A may be capable of generating more propulsive power than series propulsion module 12A. As another example, when operating at peak power, series propulsion module 12A may be capable of generating the same amount of propulsive power as series propulsion module 12A. As another example, series propulsion module 12A may positioned at an outboard portion of a wing to provide greater yaw control while series propulsion module 12N may be positioned at an inboard portion of the wing in order to provide primary propulsion.

Non-hybrid propulsion modules 18 provide propulsion using fuel. Non-hybrid propulsion module 18 may be considered "non-hybrid" in that non-hybrid propulsion modules 18 neither generate electrical power for use to generate propulsive force, nor consume electrical power to provide propulsive force. As shown in FIG. 1, each of non-hybrid propulsion modules 18 may include one or more combustion motors and one or more propulsors. For instance, non-hybrid propulsion module 18A includes combustion motor 20A and propulsor 22A, and non-hybrid propulsion module 18N includes combustion motor 20N and propulsor 22N. Non-hybrid propulsion modules 18 may operate in plurality of modes including, but not limited to, a combustion-only mode and a neutral mode. When non-hybrid propulsion module 18A operates in the combustion-only mode, combustion motor 20A may consume fuel (e.g., from a fuel tank) to provide rotational mechanical energy to propulsor 22A. When non-hybrid propulsion module 18A operates in the neutral mode, propulsor 22A may "windmill" and/or reduce its resistance (e.g., feather and/or blend with contours of the airframe).

Each of non-hybrid propulsion modules 18 may have the same or different propulsion capacities. As one example, when operating at peak power, non-hybrid propulsion module 18A may be capable of generating a propulsive power than non-hybrid propulsion module 18N. As another example, when operating at peak power, non-hybrid propulsion module 18A may be capable of generating the same amount of propulsive power as non-hybrid propulsion module 18N. As another example, non-hybrid propulsion module 18A may positioned at an outboard portion of a wing in order to provide higher yaw control while non-hybrid propulsion module 18N may be positioned at an inboard portion of the wing in order to provide primary propulsion.

Parallel propulsion modules 24 provide propulsion using fuel and electrical energy. As shown in FIG. 1, each of parallel propulsion modules 24 may include one or more electric machines, one or more combustion motors, and one or more propulsors. For instance, parallel propulsion module 24A includes electric machine 26A, combustion motor 30A, and propulsor 32A; and parallel propulsion module 24N includes electric machine 26N, combustion motor 30N, and propulsor 32N. Parallel propulsion modules 18 may operate in one or more of a plurality of modes including, but not limited to, a combustion-only mode, a combustion-generating mode, a dual-source mode, an electric-only mode, a generating mode, a regenerating mode, and a neutral mode.

When parallel propulsion module 24A operates in the combustion-only mode, combustion motor machine 30A may consume fuel (e.g., from a fuel tank) to provide rotational mechanical energy to propulsor 32A while electric machine 26A may neither generate electrical power nor consume electrical power. When parallel propulsion module 24A operates in the combustion-generating mode, combustion motor machine 30A may consume fuel (e.g., from a fuel tank) to provide rotational mechanical energy to propulsor 32A and electric machine 26A, and electric machine 26A may convert a portion of the rotational mechanical energy to electrical power that is output to electrical bus 4. When parallel propulsion module 24A operates in the electric-only mode, combustion motor machine 30A may be deactivated (e.g., not consume fuel) and electric machine 26A may convert electrical power received from electrical bus 4 into rotational mechanical energy to power propulsor 32A. When parallel propulsion module 24A operates in the dual-source mode, combustion motor machine 30A may consume fuel (e.g., from a fuel tank) to provide rotational mechanical energy to propulsor 32A while electric machine 26A may provide additional rotational mechanical energy to propulsor 32A using electrical energy sourced via electrical bus 4. When parallel propulsion module 24A operates in the generating mode, combustion motor machine 30A may consume fuel (e.g., from a fuel tank) to provide rotational mechanical energy to electric machine 26A, and electric machine 26A may convert to rotational mechanical energy to electrical power that is output to electrical bus 4. As compared to the combustion-generating mode, when parallel propulsion module 24A operates in the generating mode, propulsors 32 may be feathered or otherwise reduce or eliminate the amount of power taken from combustion motors 30 (e.g., de-clutch from a drive shaft) such that a majority of the power is used by electrical machines 26 to generate electrical power. When parallel propulsion module 24A operates in the regenerating mode, electric machine 26A may convert to rotational mechanical energy received from propulsor 32A to electrical power that is output to electrical bus 4. When parallel propulsion module 24A operates in the neutral mode, propulsor 22A may "windmill" and/or reduce its fluid resistance (e.g., feather and/or blend with contours of the airframe).

Each of parallel propulsion modules 24 may have the same or different propulsion capacities. As one example, when operating at peak power, parallel propulsion module 24A may be capable of generating a propulsive power than parallel propulsion module 24N. As another example, when operating at peak power, parallel propulsion module 24A may be capable of generating the same amount of propulsive power as parallel propulsion module 24N. As another example, parallel propulsion module 24A may positioned at an outboard portion of a wing to provide higher yaw control while parallel propulsion module 24N may be positioned at an inboard portion of the wing in order to provide primary propulsion.

For modules that include electric machines and combustion motors (i.e., power units 6 and parallel propulsion modules 24), the electric machines may be discrete components included in their own housing, or may be integral to (i.e., included/embedded in) a same housing as the combustion motors. As one example, electric machine 26A may be included in same housing and/or directly mounted to combustion motor 30A. As another example, electric machine 26A may be attached to combustion motor 30A via a drive shaft.

Additionally, for modules that include electric machines and combustion motors, the modules may include an additional starter, be started by their respective electric machine(s), or be started through some other means. As one example, combustion motor 8A may include a starter that is different than electric machine 10A. As another example, electric machine 10A may operate as a starter for combustion motor 8A.

Energy storage system (ESS) 34 may provide energy storage capacity for system 2. ESS 34 may include any devices or systems capable of storing energy (e.g., electrical energy). Examples of devices that may be included ESS 34 include, but are not limited to, batteries, capacitors, supercapacitors, flywheels, pneumatic storage, and any other device capable of storing electrical energy or energy that may be converted to electrical energy (without combustion). ESS 34 may be coupled to electrical bus 4 and may be capable of providing electrical energy to electrical bus 4 and receiving electrical energy (e.g., for charging) from electrical bus 4.

In some examples, ESS 34 may include multiple energy storage systems. For instance, ESS 34 may include a first energy storage system configured to store and provide electrical energy for propulsion and a second energy storage system configured to store and provide electrical energy for other systems, such as avionics and/or hotel loads. In some examples, ESS 34 may include a single energy storage system. For instance, ESS 34 may include a single energy storage system configured to store and provide electrical energy for propulsion and other systems.

In some examples, one or more components of ESS 34 may be swappable. For example, one or more batteries of ESS 34 may be swappable while an aircraft including system 2 is on the ground. As such, the aircraft may be quickly able to return to a fully charged state without the need to charge the batteries on the ground.

Controller 36 may control the operation of one or more components of system 2. For instance, controller 36 may control the operation of electrical bus 4, power units 6, series propulsion modules 12, non-hybrid propulsion modules 18, parallel propulsion modules 24, and ESS 34. In some examples, controller 36 may include a single controller that controls all of the components. In other examples, controller 36 may include multiple controllers that each control one or more components. Where controller 36 includes multiple controllers, the controllers may be arranged in any configuration. As one example, controller 36 may include a separate controller for each module type. For instance, controller 36 may include a first controller that controllers power units 6, a second controller that controls series propulsion modules 12, a third controller that controls non-hybrid propulsion modules 18, and a fourth controller that controls parallel propulsion modules 24. As another example, controller 36 may include a separate controller for each module, or sub-module, within the module types. For instance, controller 36 may include a separate controller for each of power units 6, a separate controller for each of series propulsion modules 12, a separate controller for each of non-hybrid propulsion modules 18, and a separate controller for each of parallel propulsion modules 24.

Controller 36 may comprise any suitable arrangement of hardware, software, firmware, or any combination thereof, to perform the techniques attributed to controller 36 herein. Examples of controller 36 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 36 includes software or firmware, controller 36 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 36 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 36 (e.g., may be external to a package in which controller 36 is housed).

In operation, system 2 may include and be propelled by any combination of series propulsion modules 12, non-hybrid propulsion modules 18, and parallel propulsion modules 24. As one example, in what may be referred to as a "series configuration," system 2 may include one or more power units 6 and one or more series propulsion modules 12. Further details of the series configuration are discussed below with reference to FIG. 2. As another example, in what may be referred to as a "series configuration with propulsive energy storage," system 2 may include one or more power units 6, one or more series propulsion modules 12, and ESS 34. Further details of the series configuration with propulsive energy storage are discussed below with reference to FIG. 3. As another example, in what may be referred to as a "parallel configuration," system 2 may include one or more parallel propulsion modules 24. Further details of the parallel configuration are discussed below with reference to FIG. 4. As another example, in what may be referred to as a "series-parallel configuration," system 2 may include one or more series propulsion modules 12 and one or more parallel propulsion modules 24. Further details of the series-parallel configuration are discussed below with reference to FIG. 5. As another example, in what may be referred to as a "series-parallel configuration with propulsive energy storage," system 2 may include one or more series propulsion modules 12, one or more parallel propulsion modules 24, and ESS 34. Further details of the series-parallel configuration with propulsive energy storage are discussed below with reference to FIG. 6.

Where multiple propulsion modules are present (e.g., multiple instances of a specific type of propulsion module, multiple different types of propulsion modules, or combinations thereof), the multiple propulsion modules may be controlled independently, collectively in groups, or completely collectively. As one example, in an example where system 2 includes multiple series propulsion modules 12, each of series propulsion modules 12 may be independently controlled. As another example, in an example where system 2 includes multiple series propulsion modules 12, all of series propulsion modules 12 may be collectively controlled. As another example, in an example where system 2 includes multiple series propulsion modules 12, a first set of series propulsion modules 12 may be collectively controlled and a second set of series propulsion modules 12 may be collectively controlled independently from the first set of series propulsion modules 12. As another example, in an example where system 2 includes multiple series propulsion modules 12 and multiple parallel propulsion modules 24, the series propulsion modules 12 may be collectively controlled and the parallel propulsion modules 24 may be collectively controlled independently from the series propulsion modules 12.

Any or all of the combustion motors described above (i.e., combustion motors 8, combustion motors 20, and/or combustion motors 30) may, in some examples, be recuperated. That is, system 2 may include one or more recuperators configured to improve the cycle efficiency of the combustion motor(s). For instance, the recuperator may place an exhaust air flow that is downstream from a combustor in a combustion motor in a heat exchange relationship with a compressed airflow that is upstream from the combustor such that the recuperator transfers thermal energy from the exhaust airflow to the compressed airflow.

Figure 2:
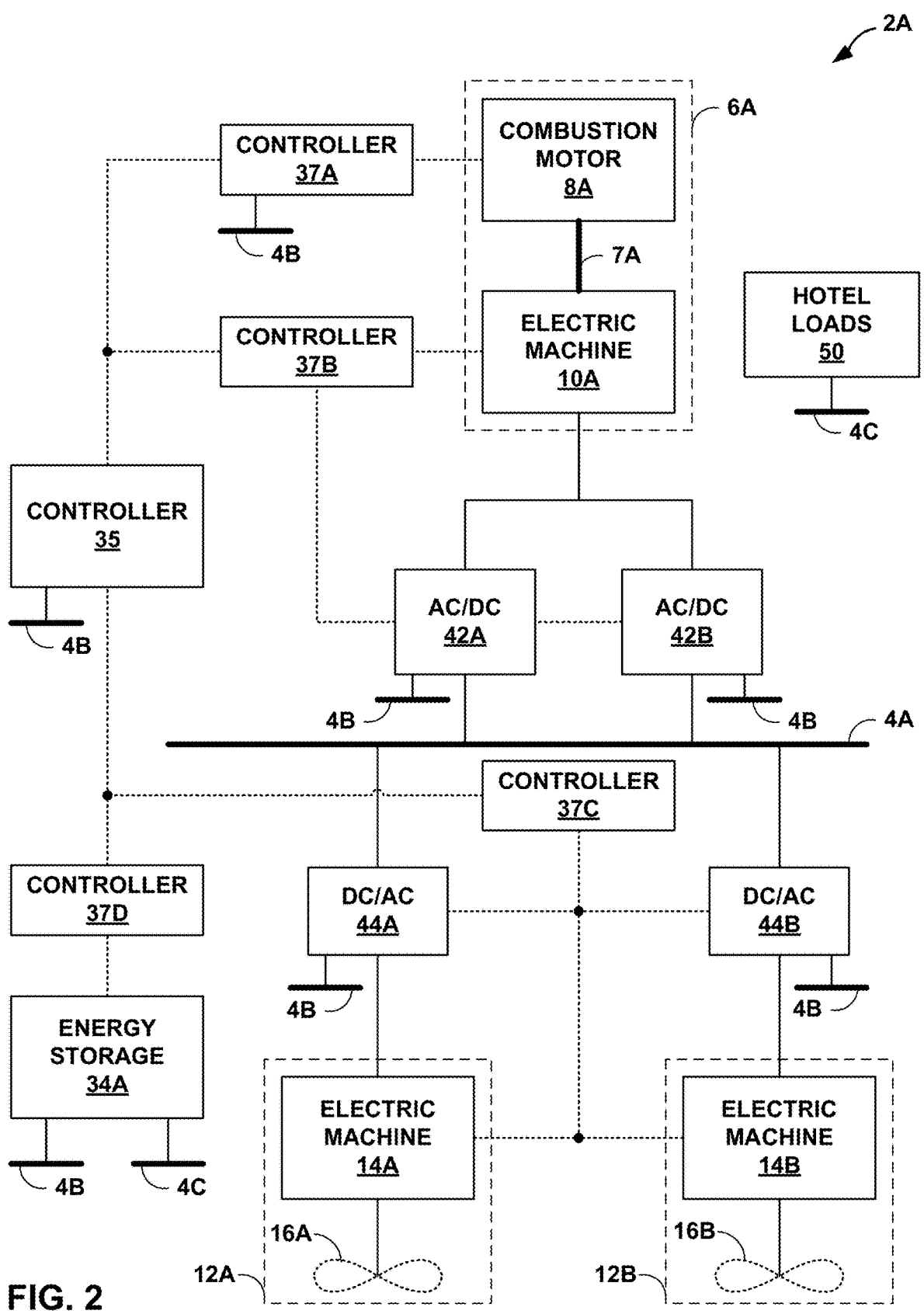
FIG. 2 is a conceptual block diagram illustrating a system that includes a hybrid propulsion system in a series configuration, in accordance with one or more techniques of this disclosure.

FIG. 2 is a conceptual block diagram illustrating a system 2A that includes a hybrid propulsion system in a series configuration, in accordance with one or more techniques of this disclosure. System 2A may represent one example of system 2 of FIG. 1 that includes power unit 6A, series propulsion module 12A, and series propulsion module 12B. As shown in FIG. 2, system 2A also includes propulsion electrical bus 4A, critical electrical bus 4B, non-critical electrical bus 4C, controller 35, controllers 37A-37D (collectively, "controllers 37"), AC/DC converters 42A and 42B (collectively, "AC/DC converters 42"), and DC/AC converters 44A and 44B (collectively, "DC/AC converters 44").

Controller 35 and controllers 37 may collectively perform the functions of controller 36 of FIG. 1. Controller 35 may operate as a system master controller and controllers 37 may operate as sub-controllers. For instance, controller 37A may operate as an engine controller to control operation of combustion motor 8A, controller 37B may operate as a generator controller to control operation of electric machine 10A and AC/DC converters 42, controller 37C may operate as a propulsor controller to control operation of series propulsion modules 12 and DC/AC converters 44, and controller 37D may operate to control operation of ESS 34A. Any of controller 35 and controllers 37 may be combined into one controller or further subdivided into additional controllers. As one example, controller 37A and controller 37B may be combined into a single controller that controls operation of combustion motor 8A, electric machine 10A and AC/DC converters 42. As another example, controller 37C may be subdivided into a first controller that controls DC/AC converter 44A and series propulsion module 12A, and a second controller that controls DC/AC converter 44B and series propulsion module 12B.

Controller 35 and controller 37 may be any type of controller capable of controlling operation of the corresponding devices/modules. For instance, controller 37A may be an engine control unit (ECU) that may be partial authority or full authority (i.e., controller 37A may be a full authority digital engine controller (FADEC)). Controller 35 and controller 37 may be implemented in any combination of hardware and software.

As shown in the example of FIG. 2, electrical busses 4 of FIG. 1 may be divided into propulsion electrical bus 4A, critical electrical bus 4B, and non-critical electrical bus 4C. Propulsion electrical bus 4A may operate to transport electrical power used for propulsion components of system 2A. For instance, propulsion electrical bus 4A may facilitate the transfer of electrical power between power unit 6A and series propulsion modules 12. In the example FIG. 2, propulsion electrical bus 4A is implemented as a DC bus or busses (e.g., a 700 volt DC bus). However, in other examples, propulsion electrical bus 4A may be implemented as an AC bus, AC busses, or a combination of one or more DC bus(es) and one or more AC bus(es).

Critical electrical bus 4B may operate to transport electrical power used by critical devices/systems of system 2A. Examples of critical devices/systems include, but are not limited to, engine controllers, avionics, flight control systems, and the like. Critical electrical bus 4B may be implemented as any combination of one or more DC bus(es) and/or one or more AC bus(es). For instance, critical electrical bus 4B may be implemented as a 28 volt DC electrical bus.

Non-critical electrical bus 4C may operate to transport electrical power used by non-critical devices/systems of system 2A. Examples of non-critical devices/systems include, but are not limited to, hotel loads 50, engine starters (e.g., a starter of combustion motor 8A), and the like. Non-critical electrical bus 4C may be implemented as any combination of one or more DC bus(es) and/or one or more AC bus(es). For instance, non-critical electrical bus 4C may be implemented as a 28 volt DC electrical bus.

Hotel loads 50 include devices and systems that consume electrical power for non-critical purposes (e.g., purposes other than propulsion and flight control). Examples of hotel loads 50 include, but are not limited to, cabin lighting, cabin climate control, cooking, and the like.

AC/DC converters 42 may operate as rectifiers to convert AC electrical power generated by one or more components of system 2A into DC electrical power. For instance, AC/DC converters 42 may convert AC electrical power generated by electric machine 10A into DC electrical power that is output via propulsion electrical bus 4A.

DC/AC converters 44 may operate as inverters to convert DC electrical power received from one or more components of system 2A into AC electrical power. For instance, DC/AC converters 44 may convert DC electrical power received via propulsion electrical bus 4A into AC electrical power that is used by series propulsion modules 12 to provide propulsion to system 2A (e.g., used by electric machines 14A and 14B to respectively drive propulsors 16A and 16B).

As discussed above with reference to FIG. 1, in some examples, ESS 34 may be capable of storing and providing electrical energy for propulsion and other systems/devices. In general, the size and/or weight of ESS 34 may be dependent on the electrical storage capacity of ESS 34. The greater the electrical storage capacity, the greater the size and/or weight of ESS 34. The amount of electrical energy used for propulsion may be significantly greater than the amount of electrical energy used for other systems/devices of system 2A. As such, the size and/or weight of ESS 34 in examples where ESS 34 is used to store electrical energy for propulsion may be greater than the size and/or weight of ESS 34 in examples where ESS 34 is not used to store electrical energy for propulsion.

In accordance with one or more techniques of this disclosure, system 2A may not include an energy storage system configured to store or provide electrical energy for propulsion. For instance, as shown in FIG. 2, ESS 34A may not be configured to output electrical energy to series propulsion modules 12 for driving propulsors 16. Similarly, in some examples, ESS 34A may not be configured to receive electrical power generated by power unit 6A, which is configured to output electrical energy to series propulsion modules 12 for driving propulsors 16. As such, by not using ESS 34A to store or provide electrical energy for propulsion, the size and/or weight of ESS 34A may be reduced relative to energy storage systems that are configured to store or provide electrical energy for propulsion.

As discussed above, in some examples, ESS 34A may not be configured to receive electrical power generated by power unit 6A. In some of such examples, ESS 34A may be charged while system 2A is on the ground and be sized to have enough energy storage capacity to power systems/devices attached to critical bus 4B and non-critical bus 4C for a projected flight time. Additionally or alternatively, ESS 34A may be configured to receive electrical energy generated by power unit 6A or any other electrical power source of system 2A (e.g., a different combustion operated generator, solar panels, a ram-air turbine, or the like).

In operation, system 2A may function in a plurality of modes including, but not limited to, an electric-only mode and a neutral mode. In the electric-only mode, controller 37A may cause combustion-motor 8A to burn fuel to generate rotational mechanical energy, which is used to drive electric machine 10A via drive shaft 7A. Controller 37B may operate electric machine 10A to convert the rotational mechanical energy into AC electrical power, and operate AC/DC converters 42 to rectify the AC electrical power into DC electrical power for output to propulsion electrical bus 4A. Controller 37C may operate DC/AC converters 44 to convert DC electrical power received from propulsion electrical bus 4A into AC electrical power for output to electrical machines 12. Controller 37C may operate electrical machines 12 to convert the AC electrical power into rotational mechanical energy to drive a respective propulsor of propulsors 16.

In the neutral mode, controller 37A may shutdown combustion-motor 8A such that combustion-motor 8A ceases to burn fuel. Additionally, in some examples, controller 37C may modify a shape/position/orientation of one or more aspects of series propulsion modules 12 to reduce wind resistance. As one example, where propulsors 16 include variable pitch propellers, controller 37C may "feather" the blades of the propellers (i.e., rotate the blades to be substantially parallel with the airflow). As another example, controller 37C may fold-up all or portions of propulsors 16.

The hybrid system 2A may present one or more advantages. As one example, as discussed above, system 2A may reduce a weight of the energy storage system. As another example, system 2A may enable power to be imparted on the DC bus from engine driven generators. As another example, system 2A may allow propulsor motors to receive independent varying level of power to enable the thrust differential between propulsors.

Figure 3:
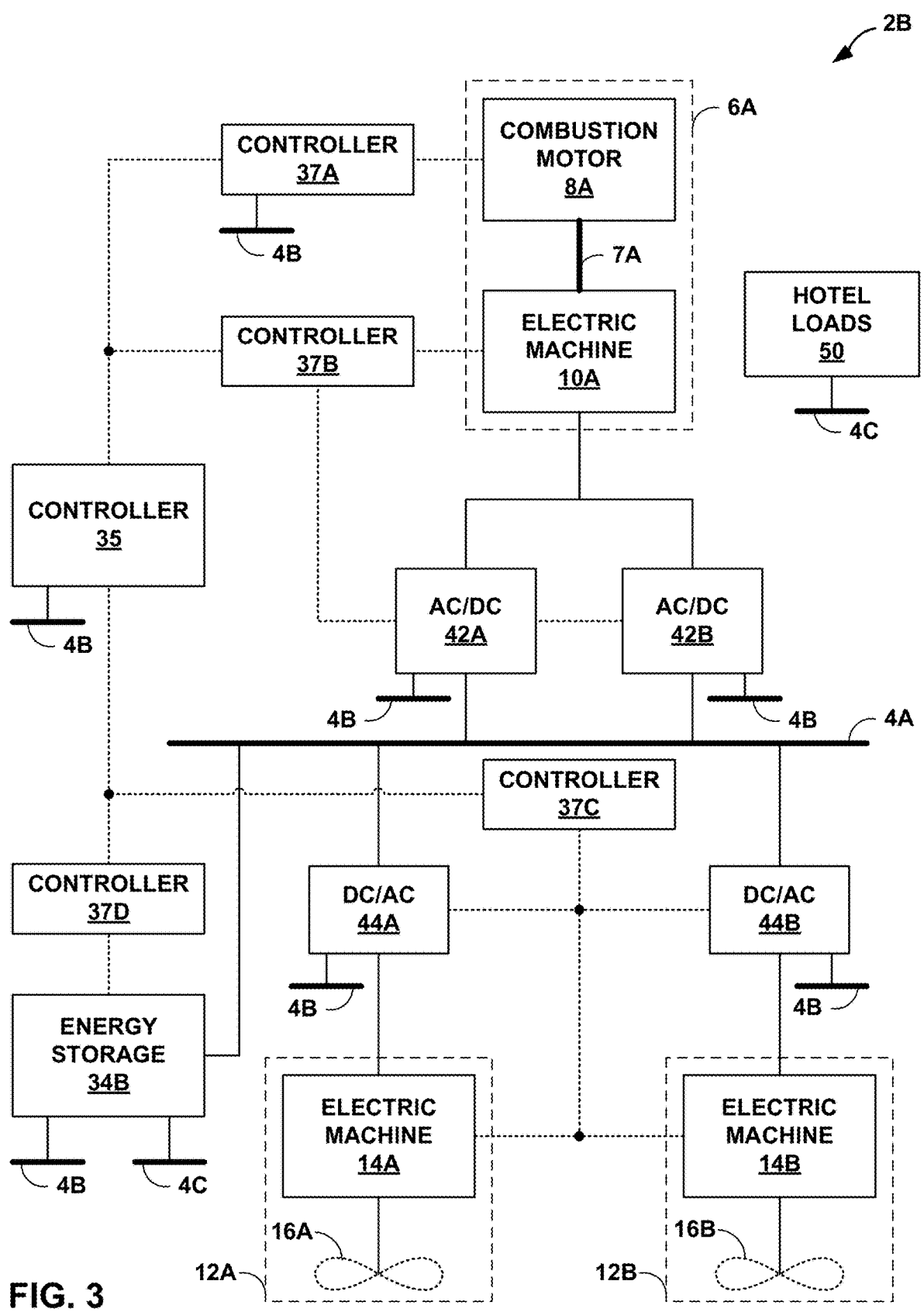
FIG. 3 is a conceptual block diagram illustrating a system that includes a hybrid propulsion system in a series configuration with propulsive energy storage, in accordance with one or more techniques of this disclosure.

FIG. 3 is a conceptual block diagram illustrating a system 2B that includes a hybrid propulsion system in a series configuration with propulsive energy storage, in accordance with one or more techniques of this disclosure. System 2B may include components similar to system 2A of FIG. 2. However, as shown in FIG. 3, system 2B includes an energy storage system that is configured to store and provide electrical energy for propulsion. For instance, system 2B includes ESS 34B, which is coupled to propulsion electrical bus 4A and configured to provide propulsive electrical energy to series propulsion modules 12 via propulsion electrical bus 4A. Additionally, ESS 34B may be configured to receive electrical energy via propulsion electrical bus 4A.

In addition to the electric-only and neutral modes described above, system 2B may operate in a dual-source electric-only mode, a regenerating mode and a generating mode. In the dual-source electric-only mode, controllers 37A and 37B may operate power unit 6A and AC/DC converters 42 in a manner similar to the electric-only mode discussed above. Additionally, controller 37D may cause ESS 34B to output DC electrical power onto propulsion electrical bus 4A. Controller 37C may operate DC/AC converters 44 and series propulsion modules 12 in a manner similar to the electric-only mode discusses above, with a difference being that electrical energy used by series propulsion modules 12 for propulsion is contemporaneously sourced from power unit 6A and ESS 34B.

In the regenerating mode, controller 37C may cause series propulsion modules 12 to operate as generators (e.g., operate as ram air turbines) by converting rotational mechanical energy of propulsors 16 into AC electrical power. Controllers 37C may operate DC/AC converters 44 to convert the AC electrical power into DC electrical power for output to propulsion electrical bus 4A. Controller 37D may operate ESS 34B to charge from propulsion electrical bus 4A using the DC electrical power output by DC/AC converters 44.

In the generating mode, controllers 37A and 37B may operate power unit 6A and AC/DC converters 42 in a manner similar to the electric-only mode discussed above. However, as opposed to controller 37C operating DC/AC converters 44 and series propulsion modules 12 to utilize the generated power for propulsion, controller 37D may cause ESS 34B to store the generated power (i.e., to charge).

The hybrid system 2B may present one or more advantages. As one example, where the regenerating mode is used while an aircraft including system 2B is descending, ESS 34B may obtain enough charge on decent to enable system 2B to operate in the dual-source electric-only mode on take-off and/or ascent without the need to charge ESS 34B on the ground. Additionally or alternatively, the generating mode may be used while the aircraft is on the ground such that ESS 34B may obtain enough charge to enable system 2B to operate in the dual-source electric-only mode on take-off and/or ascent without the need to charge ESS 34B on the ground from an external charging source. As such, system 2B may enable hybrid aircraft to utilize airports that lack ground charging facilities.

As another example, the dual-source electric mode may enable system 2B to provide a similar amount of thrust with a relatively smaller sized combustion motor. As such, system 2B enables a weight reduction in hybrid aircraft. For similar reasons, system 2B may enable a reduction in emissions from aircraft.

As another example, system 2B may allow the transfer of excess power on the DC bus to the ESS. For instance, ESS 34B may be "trickle" charged using excess power generated by power unit 6A (e.g., during cruise). As another example, system 2B may allow power to be imparted on the DC bus from one or both of engine driven generators and ESS. The level of power demand placed on the DC bus is shared between ESS and engine driven generator system at varying percentage of power share depending on the operational needs of the platform, available stored electrical energy and fuel. As another example, application of power from both the ESS and engine driven generator system in system 2B may allow the power available on the bus to be higher than that from a standalone turbo-generator offering a "boost" to the available power for peak power demand operations. As another example, application of power from both the ESS and engine driven generator system in system 2B may allow fluctuating power demands on the bus to be met while maintaining a constant power demand on the engine. As another example, system 2B may allow propulsor motors to receive independent varying level of power to enable the thrust differential between propulsors. As another example, system 2B may allow the aircraft to self-start without the need to an external starter or APU. As another example, system 2B may deliver power for all hotel loads and avionics. As another example, system 2B may deliver all power to all critical functions/systems.

While illustrated in FIGS. 2 and 3 as including a single power unit and multiple series propulsion modules, systems 2A and 2B are not so limited. For instance, one or both of systems 2A and 2B may include multiple power units and/or a single series propulsion module.

Including multiple power units may present one or more advantages. As one example, a series hybrid system with multiple power units may be more fault tolerant than a series hybrid system with a single power unit. For instance, in a series hybrid system that includes two power units, flight power would still be available in the event that one of the power units failed or otherwise was shutdown.

Figure 4:
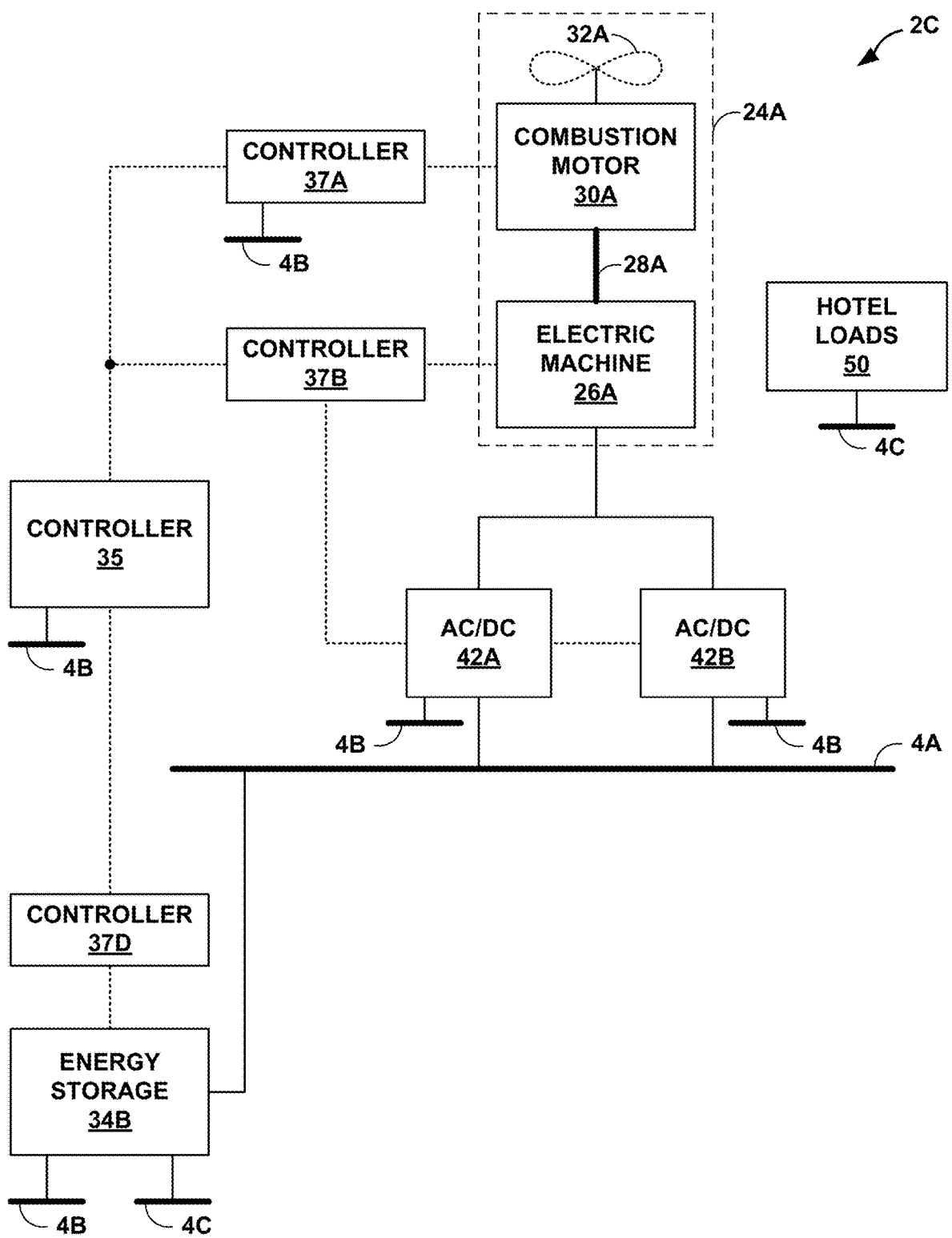
FIG. 4 is a conceptual block diagram illustrating a system that includes a hybrid propulsion system in a parallel configuration, in accordance with one or more techniques of this disclosure.

FIG. 4 is a conceptual block diagram illustrating a system 2C that includes a hybrid propulsion system in a parallel configuration, in accordance with one or more techniques of this disclosure. System 2C may represent one example of system 2 of FIG. 1 that includes parallel propulsion module 24A, and ESS 34B. As shown in FIG. 4, system 2C also includes propulsion electrical bus 4A, critical electrical bus 4B, and non-critical electrical bus 4C, controller 35, controllers 37, and AC/DC converters 42.

Controllers 35 and 37 may perform operation similar to those discussed above. For instance, controller 35 may operate as a system master controller, controller 37A may control operation of combustion motor 30, controller 37B may control operation of electric machine 26A and AC/DC converters 42, and controller 37D may control operation of ESS 34B.

However, as opposed to systems 2A and 2B that included series propulsion modules (e.g., propulsion modules without a mechanical linkage between combustion motor and propulsor), system 2C includes parallel propulsion module 24A. While illustrated as including a single parallel propulsion module, system 2C is not so limited and may include a plurality of parallel propulsion modules.

In operation, system 2C may function in a plurality of modes including, but not limited to, a combustion-only mode, a dual-source mode, a combustion-generating mode, an electric-only mode, a generating mode, and a regenerating mode. In the combustion-only mode, controller 37A may cause combustion-motor 30A to burn fuel to generate rotational mechanical energy, which drives propulsor 32A. In the combustion-only mode, electrical machine 26A may not supply or remove rotational energy (other than minimal frictional losses and the like) drive shaft 28A. For instance, electric machine 26A may be clutched or otherwise mechanically decoupled from drive shaft 28A.

In the dual-source mode, controller 37A may cause combustion-motor 30A to burn fuel to generate rotational mechanical energy, which drives propulsor 32A. Additionally, controller 37B may cause electric machine 26A to add rotational energy to drive propulsor 32A using electrical energy supplied from ESS 34B. In some examples, as opposed to causing drive shaft 28A to rotate faster than the speed caused by combustion motor 30A, electric machine 26A may provide additional torque to drive shaft 28A. As such, in examples where propulsor 32A is a variable pitch propeller, controller 37A may adjust the pitch such that a higher level of thrust is obtained without increasing the rotational speed to propulsor 32A.

In the combustion-generating mode, controller 37A may cause combustion-motor 30A to burn fuel to generate rotational mechanical energy, which drives propulsor 32A. Additionally, controller 37B may cause electric machine 26A to convert rotational energy generated by combustion motor 30A into AC electrical power. Controller 37B may cause AC/DC converters to convert the AC electrical power into DC electrical power for output onto propulsion electrical bus 4A. Controller 37D may cause ESS 34B to store the generated electrical power.

In the electric-only mode, controller 37A may cause combustion motor 30A to shutdown and cease consuming fuel. Controller 37B may cause electric machine 26A to convert electrical power sourced from ESS 34B into rotational mechanical energy to drive propulsor 32A.

In the generating mode, the components of system 2C may perform functions similar to the combustion-generating mode with a difference being that controller 37A may cause propulsor 32A to decouple from combustion motor 30A or, if variable pitch, cause propulsor 32A to feather. As such, controller 37A may cause all, or at least a vast majority, of the rotational mechanical energy generated by combustion motor 30A to be available for conversion into electrical energy by electric machine 26A.

In the regenerating mode, the components of system 2C may perform functions similar to the electric-only mode with a difference being that the flow of electrical power is reversed. For instance, parallel propulsion module 24A may convert rotational mechanical energy received via propulsor 32A into electrical energy that is stored by ESS 34B.

The parallel hybrid system 2C may present one or more advantages. As one example, the dual-source mode may enable system 2C to provide a similar amount of thrust with a relatively smaller sized combustion motor. As such, system 2C enables a weight reduction in hybrid aircraft. For similar reasons, system 2B may enable a reduction in emissions from aircraft.

As another example, as the combustion-generating mode enable system 2C to store propulsion energy for future use (i.e., in ESS 34B), the combustion-generating mode may enable controller 37A to operate combustion motor 30A at an optimal level (e.g., a most fuel efficient level) without wasting energy, even if the energy resulting at the optimal level is not immediately required. In other words, system 2C may allow the transfer of excess power on the DC bus to the ESS for future use. As another example, application of mechanical power from electric machine motoring may allow the power available on the propulsor shaft to be higher than that from a standalone engine, thereby offering a "boost" to the available power for peak power thrust operations. As another example, application of power from the ESS powered motor may allow fluctuating power demands on the shaft to be met while maintaining a constant power demand on the engine. As another example, system 2C may allow an aircraft to self-start without the need to an external starter or APU. As another example, system 2C may deliver power for all hotel loads and avionics. As another example, system 2C may deliver all power to all critical functions/systems.

Figure 5:
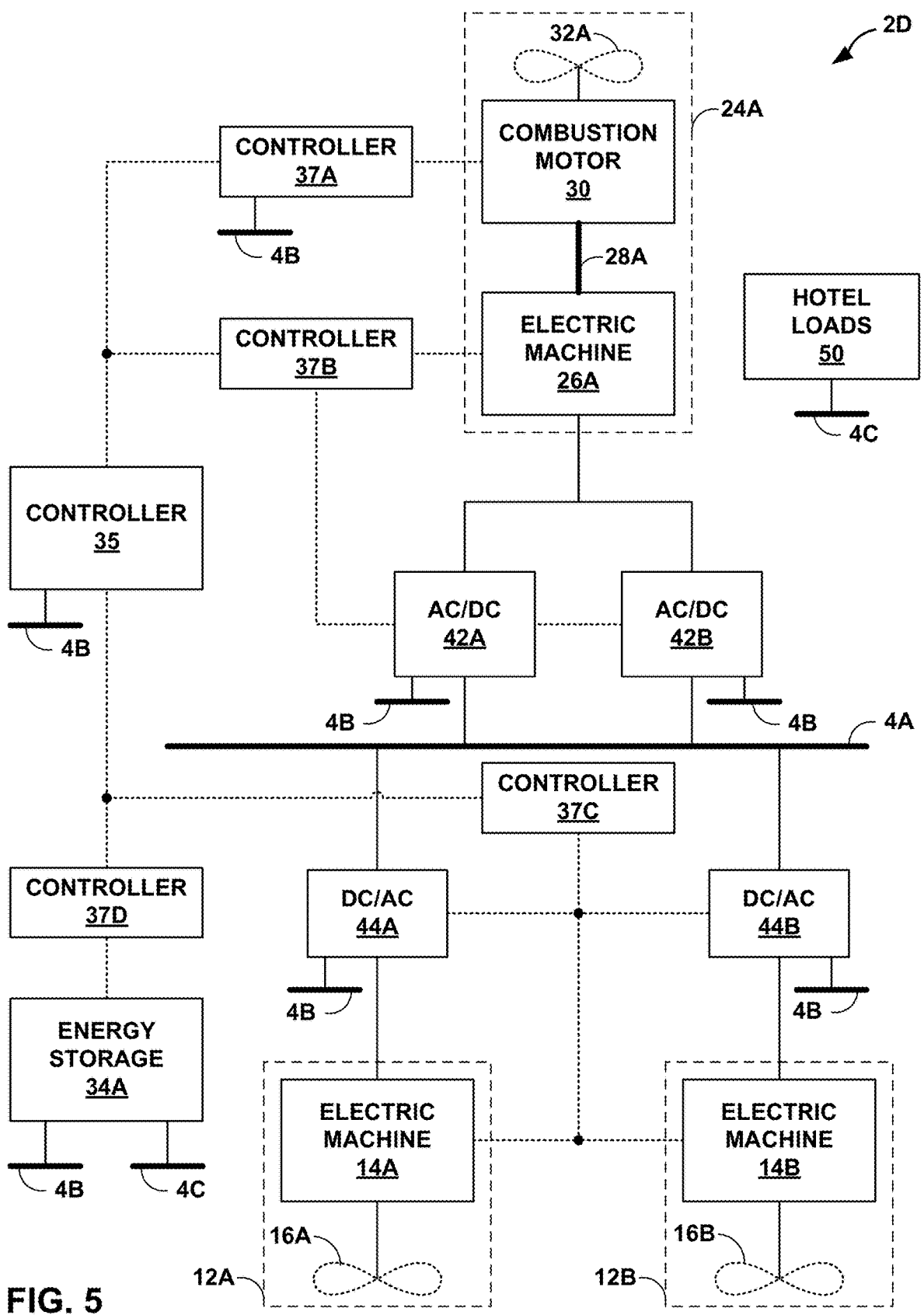
FIG. 5 is a conceptual block diagram illustrating a system that includes a hybrid propulsion system in a series-parallel configuration, in accordance with one or more techniques of this disclosure.

FIG. 5 is a conceptual block diagram illustrating a system 2D that includes a hybrid propulsion system in a series-parallel configuration, in accordance with one or more techniques of this disclosure. System 2D may include components similar to system 2A of FIG. 2 and system 2C of FIG. 4. However, as shown in FIG. 5, the ESS 34 included in system 2D is not configured to provide electrical energy for propulsion.

Figure 6:
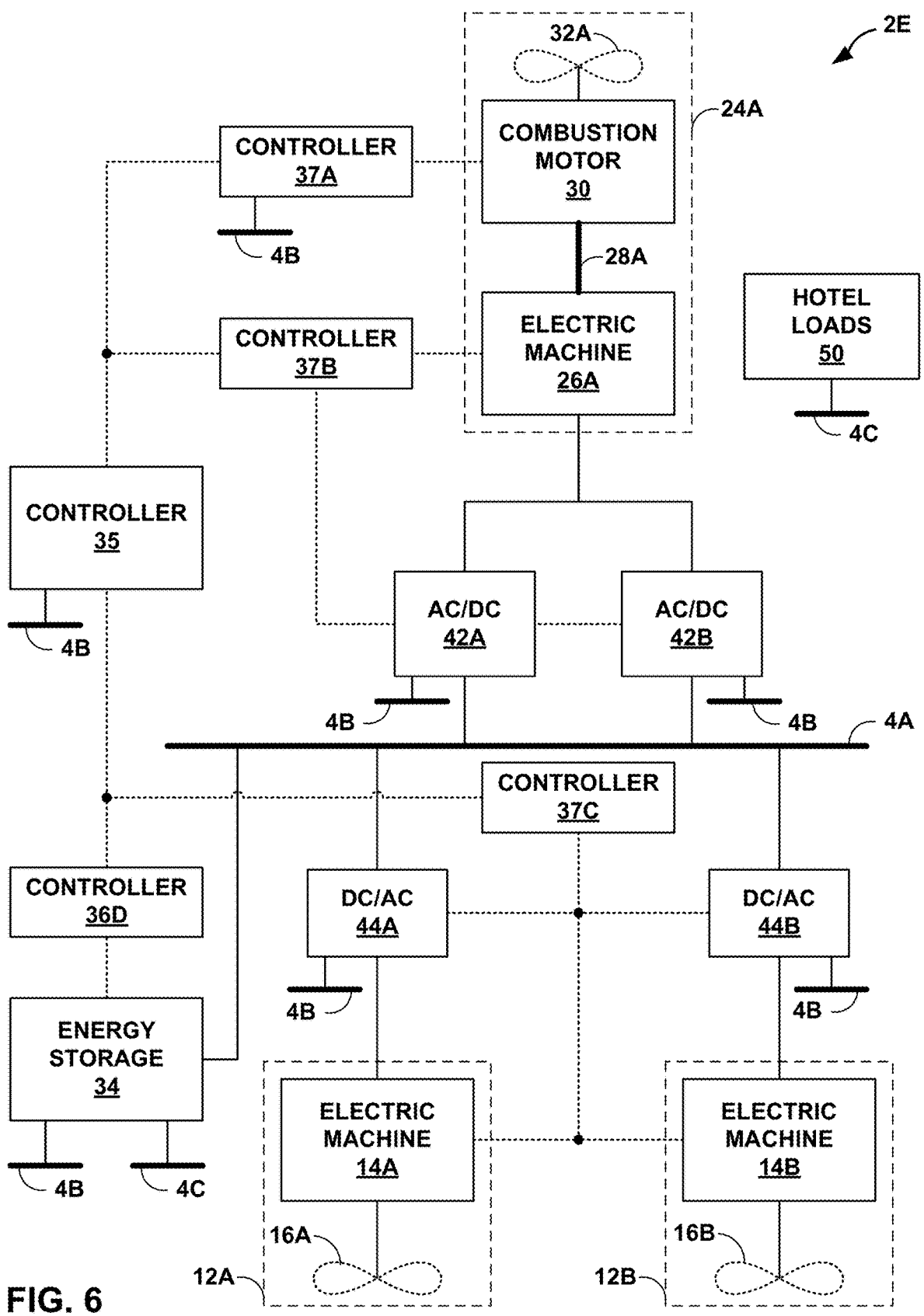
FIG. 6 is a conceptual block diagram illustrating a system that includes a hybrid propulsion system in a series-parallel configuration with propulsive energy storage, in accordance with one or more techniques of this disclosure.

FIG. 6 is a conceptual block diagram illustrating a system 2E that includes a hybrid propulsion system in a series-parallel configuration with propulsive energy storage, in accordance with one or more techniques of this disclosure. System 2E may include components similar to system 2D of FIG. 5. However, as shown in FIG. 6, system 2E includes an energy storage system that is configured to store and provide electrical energy for propulsion. For instance, system 2E includes ESS 34B, which is coupled to propulsion electrical bus 4A and configured to provide propulsive electrical energy to series propulsion modules 12 and/or parallel propulsion module 24A via propulsion electrical bus 4A. Additionally, ESS 34B may be configured to receive electrical energy via propulsion electrical bus 4A.

The series-parallel system 2E may be configured to operate in any of the modes described above with reference to the series and parallel configurations. Additionally, the series-parallel system 2E may operate in one or more additional modes. As one example, the series-parallel system 2E may operate in a dual source mode in which electrical energy used by series propulsion modules 12 is sourced from an energy storage system (e.g., ESS 34) and one or more power units (e.g., power units 6). In this dual source mode, the parallel propulsion modules (e.g., parallel propulsion module 24A) may burn fuel to drive propulsors or may be inactive. As another example, the series-parallel system 2E may operate in a triple source mode in which the parallel propulsion modules (e.g., parallel propulsion module 24A) may burn fuel to drive propulsors (e.g., propulsor 32A) and their electrical machines output electrical energy via propulsion electrical bus 4A, electrical energy used by series propulsion modules 12 is simultaneously sourced from all three of an energy storage system (e.g., ESS 34), one or more power units (e.g., power units 6), and the parallel propulsion modules.

The series-parallel hybrid system 2E may present one or more advantages. As one example, system 2E may allow power to be imparted on the DC bus from one or both of engine driven generators and an ESS. As another example, power demand level placed on the DC bus may be shared between ESS and engine driven generator system at varying percentage of power share depending on the operational needs of the platform, available stored electrical energy and/or fuel. As another example, application of mechanical power from electric machine motoring may allow the power available on the propulsor shaft to be higher than that from a standalone engine, thereby offering a "boost" to the available power for peak power thrust operations. As another example, application of power from the ESS powered motor may allow fluctuating power demands on the shaft to be met while maintaining a constant power demand on the engine. As another example, application of power from both the ESS and engine driven generator system may allow fluctuating power demands on the bus to be met while maintaining a constant power demand on the engine. As another example, system 2E may allow propulsor motors to receive independent varying level of power to enable the thrust differential between propulsors. As another example, system 2E may allow an aircraft to self-start without the need to an external starter or APU. As another example, system 2E may deliver power for all hotel loads and avionics. As another example, system 2E may allow deliver all power to all critical functions/systems.

Figure 7:
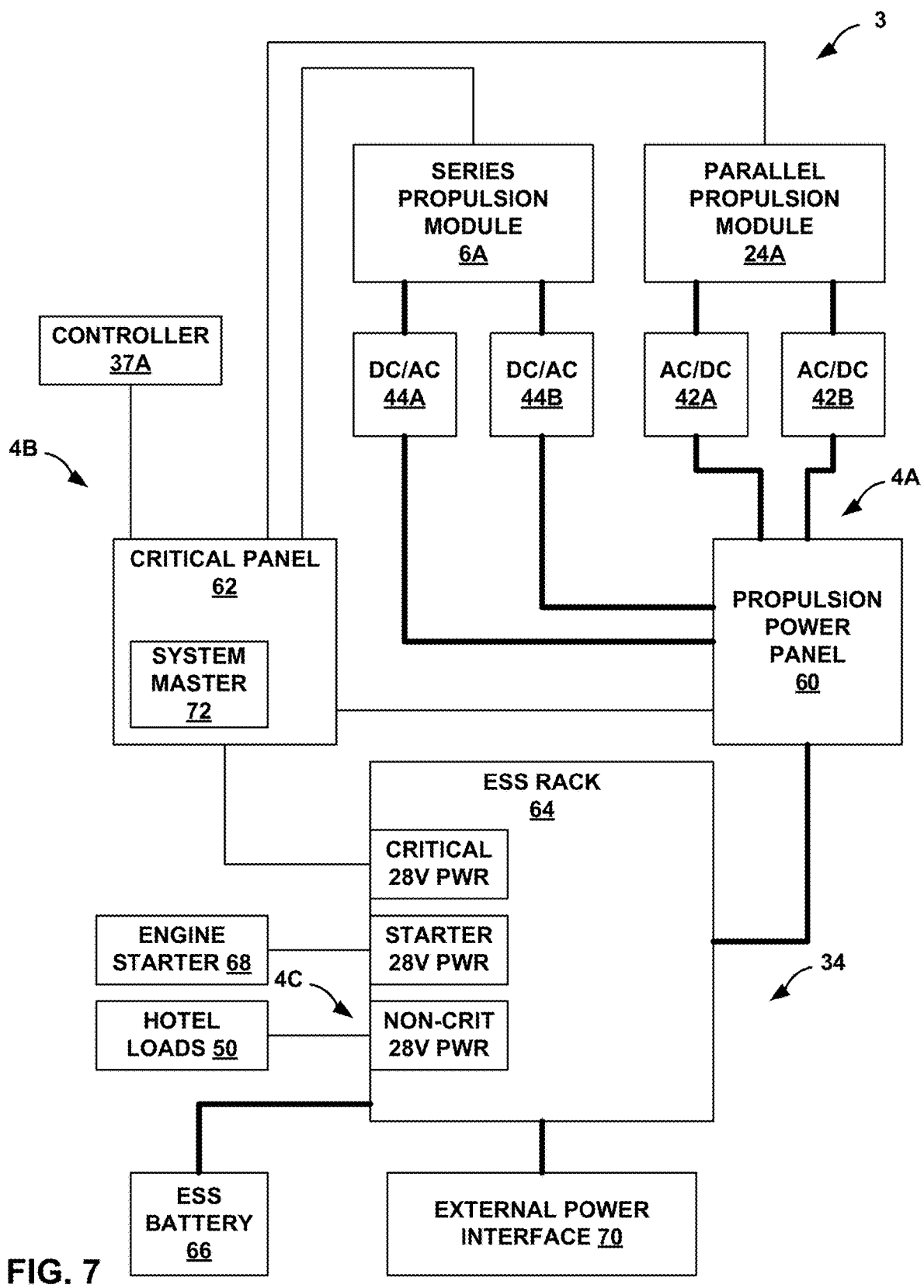
FIG. 7 is a conceptual diagram illustrating an example electrical layout for a hybrid propulsion system, in accordance with one or more techniques of this disclosure.

FIG. 7 is a conceptual diagram illustrating an example electrical layout for a hybrid propulsion system, in accordance with one or more techniques of this disclosure. As shown in FIG. 7, system 3 includes propulsion electrical bus 4A, critical electrical bus 4B, non-critical electrical bus 4C, series propulsion module 6A, parallel propulsion module 24A, AC/DC converters 42, DC/AC converters 44, controller 37A, critical power panel 62, propulsion power panel 60, ESS 34, ESS rack 64, ESS battery 66, engine starter 68, and external power interface 70. Propulsion electrical bus 4A, critical electrical bus 4B, non-critical electrical bus 4C, series propulsion module 6A, series propulsion module 6A, parallel propulsion module 24A, AC/DC converters 42, DC/AC converters 44, and controller 37A may perform operations described above.

As shown in FIG. 7, ESS 34 may include ESS rack 64, ESS battery 66, and external power interface 70. ESS rack 64 may operate to provide electrical power to any of propulsion electrical bus 4A, critical electrical bus 4B, and non-critical electrical bus 4C. ESS rack 64 may be coupled to each of the electrical busses 4A-4C, ESS battery 66, and external power interface 70. ESS rack 64 may facilitate the transfer of electrical power amongst various components. As one example, ESS rack 64 may utilize electrical power stored in ESS battery 66 to supply 28 volt DC power to critical panel 62 via critical electrical bus 4B. As another example, ESS rack 64 may utilize electrical power stored in ESS battery 66 to supply 28 volt DC power to hotel loads 50 via non-critical electrical bus 4B. As another example, ESS rack 64 may utilize electrical power stored in ESS battery 66 to supply 700 volt DC power to propulsion power panel 60 via propulsion electrical bus 4A. As another example, ESS rack 64 may utilize electrical power stored in ESS battery 66 to supply 28 volt DC power to engine starter 68 to start a combustion engine.

External power interface 70 may enable system 3 to receive power from one or more external sources and/or provide power to one or more external loads. For instance, external power interface 70 may include one or more electrical receptacles (e.g., plugs) that may be connected to a terrestrial power grid at an airport to facilitate charging of ESS battery 66.

As shown in FIG. 7, propulsion electrical bus 4A may include propulsion power panel 60, which may facilitate the transfer of electrical power between ESS 34, series propulsion module 6A, and parallel propulsion module 24A. Propulsion power panel 60 may include one or more mechanical or solid state power switches to facilitate the power routing. In some examples, propulsion power panel 60 may be capable of routing power amongst any arbitrary combination of ESS 34, series propulsion module 6A, and parallel propulsion module 24A. For instance, propulsion power panel 60 may include a full cross-point switching matrix.

As shown in FIG. 7, critical electrical bus 4B may include critical power panel 62, which may facilitate the transfer of electrical power to critical systems/devices. In some examples, one or more additional systems/devices may be included in critical power panel 62. For instance, system master controller 72, which may be an example of controller 35 or controller 36, may be included in critical power panel 62.

Each of propulsion power panel 60, critical panel 62, and ESS rack 64 may be discrete physical components. The physical components may be located in a common area of an airframe, or at different areas around the airframe. System 3 may include various electrical protections elements in between and/or amongst power panel 60, critical panel 62, and ESS rack 64. For instance, system 3 may include components and be configured such that critical electrical bus 4B is functionally and physically independent from other power systems (e.g., electrical busses 4A and 4C).

Figure 8:
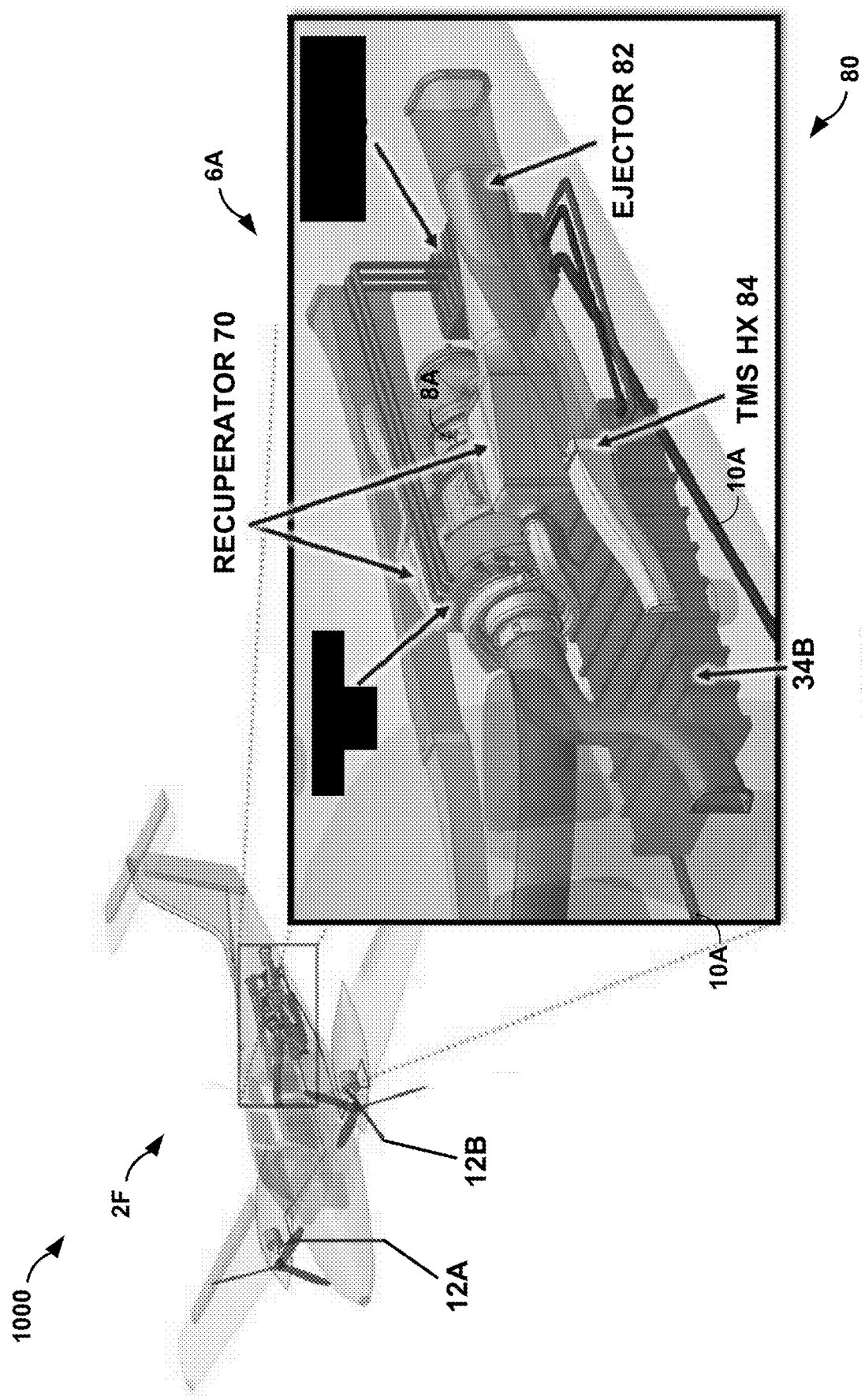
FIG. 8 is a schematic diagram of an aircraft that includes a hybrid propulsion system, in accordance with one or more techniques of this disclosure.

FIG. 8 is a schematic diagram of an aircraft that includes a hybrid propulsion system, in accordance with one or more techniques of this disclosure. As shown in FIG. 8, aircraft 1000 include system 2F, which includes series propulsion modules 12A and 12B, ESS 34B, and power unit 6A. In the example of FIG. 8, system 2F further includes recuperator 70 and thermal management system (TMS) 80. As discussed above, recuperator 70 may place an exhaust air flow that is downstream from a combustor (i.e., a combustor of combustion motor 8A) in a combustion motor in a heat exchange relationship with a compressed airflow that is upstream from the combustor such that recuperator 70 transfers thermal energy from the exhaust airflow to the compressed airflow.

TMS 80 may be configured to manage thermal aspects of system 2F. For instance, TMS 80 may manage a temperature of a battery of ESS 34B. In some examples TMS 80 may include one or more fans. In some examples, TMS 80 may be fanless. As shown in FIG. 8, TMS 80 may include a heat ejector 82 and a heat exchanger 84.

The following examples may illustrate one or more aspects of the disclosure:

Example 1

A system comprising: one or more power units configured to output electrical energy onto one or more electrical busses; a plurality of propulsors; and a plurality of electrical machines, each respective electrical machine configured to drive a respective propulsor of the plurality of propulsors using electrical energy received from at least one of the one or more electrical busses.

Example 2

The system of example 1, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 3

The system of example 2, wherein pairs of the propulsors and the electrical machines each comprise respective series propulsion units, the system further comprising: one or more parallel propulsion units.

Example 4

The system of example 1, wherein the system does not include an energy storage system configured to provide electrical energy to the plurality of electrical machines for driving the propulsors.

Example 5

The system of example 4, further comprising one or more electrical energy storage devices configured to provide electrical energy to one or more devices other than the plurality of electrical machines.

Example 6

The system of any combination of examples 1-5, wherein at least one of the plurality of electrical machines is configured to: generate electrical energy using mechanical energy derived from a corresponding propulsor; and output the generated electrical energy onto the one or more electrical busses.

Example 7

The system of any combination of examples 1-6, wherein the one or more electrical busses comprise direct current (DC) electrical busses.

Example 8

The system of any combination of examples 1-7, wherein the one or more power units comprise a plurality of power units.

Example 9

The system of example 8, wherein an amount of electrical energy generated by each of the plurality of power units is independently controllable.

Example 10

A method of propelling an aircraft, the method comprising: outputting, by one or more power units, electrical energy onto one or more electrical busses; and driving, by each respective electrical machine of a plurality of electrical machines and using electrical energy received from at least one of the electrical busses, a respective propulsor of a plurality of propulsors.

Example 11

The method of example 10, further comprising: charging, by one or more electrical energy storage systems, using electrical energy sourced via the at least one or more electrical busses; and discharging, by the one or more electrical energy storage systems, to provide electrical energy to the at least one of the one or more electrical busses.

Example 12

The method of example 11, wherein the discharging to provide electrical energy to the one or more electrical busses, the outputting electrical energy to the one or more electrical busses, and the driving the propulsors using electrical energy received from the electrical busses are performed simultaneously in a dual source mode.

Example 13

The method of any combination of examples 10-12, wherein the one or more power units comprise at least a first power unit and a second power unit, and wherein outputting the electrical energy comprises: outputting, at a first time and by the first power unit, a first amount of electrical energy via the one or more electrical busses; and outputting, at the first time and by the second power unit, the first amount of electrical energy via the one or more electrical busses.

Example 14

The method of example 13, wherein outputting the electrical energy comprises: outputting, at a second time and by the first power unit, a second amount of electrical energy via the one or more electrical busses; and outputting, at the second time and by the second power unit, a third amount of electrical energy via the one or more electrical busses, wherein the third amount of electrical energy is different than the second amount of electrical energy.

Example 15

The method of any combination of examples 10-14, wherein pairs of the propulsors and the electrical machines each comprise respective series propulsion units, the method further comprising: driving, by one or more combustion motors that are not included in the series propulsion units, one or more propulsors that are not included in the series propulsion units.

Example 16

An airframe comprising: one or more power units configured to output electrical energy onto one or more electrical busses; a plurality of propulsors; and a plurality of electrical machines, each respective electrical machine configured to drive a respective propulsor of the plurality of propulsors using electrical energy received from at least one of the one or more electrical busses.

Example 17

The airframe of example 16, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 18

The airframe of example 17, wherein pairs of the propulsors and the electrical machines each comprise respective series propulsion units, the airframe further comprising: one or more parallel propulsion units.

Example 19

The airframe of example 16, wherein the airframe does not include an electrical energy storage system configured to provide electrical energy to the plurality of electrical machines for driving the propulsors.

Example 20

The airframe of any combination of examples 16-19, wherein the one or more power units comprise a plurality of power units.

Example 21

A system comprising: a plurality of power units configured to output electrical energy onto one or more electrical busses; one or more propulsors; and one or more electrical machines, each respective electrical machine configured to drive a respective propulsor of the one or more propulsors using electrical energy received from at least one of the one or more electrical busses.

Example 22

The system of example 21, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 23

The system of example 22, wherein pairs of the propulsors and the electrical machines each comprise respective series propulsion units, the system further comprising: one or more parallel propulsion units.

Example 24

The system of example 21, wherein the system does not include an energy storage system configured to provide electrical energy to the plurality of electrical machines for driving the propulsors.

Example 25

The system of example 24, further comprising one or more electrical energy storage devices configured to provide electrical energy to one or more devices other than the plurality of electrical machines.

Example 26

The system of any combination of examples 21-25, wherein at least one of the plurality of electrical machines is configured to: generate electrical energy using mechanical energy derived from a corresponding propulsor; and output the generated electrical energy onto the one or more electrical busses.

Example 27

The system of any combination of examples 21-26, wherein the one or more electrical busses comprise direct current (DC) electrical busses.

Example 28

The system of any combination of examples 21-27, wherein the one or more electrical machines comprise a plurality of electrical machines, and wherein the one or more propulsors comprise a plurality of propulsors.

Example 29

The system of any combination of examples 21-28, wherein an amount of electrical energy generated by each of the plurality of power units is independently controllable.

Example 30

A method of propelling an aircraft, the method comprising: outputting, by a plurality of power units, electrical energy onto one or more electrical busses; and driving, by one or more electrical machines and using electrical energy received from at least one of the electrical busses, one or more propulsors.

Example 31

The method of example 30, further comprising: charging, by one or more electrical energy storage systems, using electrical energy sourced via the at least one or more electrical busses; and discharging, by the one or more electrical energy storage systems, to provide electrical energy to the at least one of the one or more electrical busses.

Example 32

The method of example 31, wherein the discharging to provide electrical energy to the one or more electrical busses, the outputting electrical energy to the one or more electrical busses, and the driving the one or more propulsors using electrical energy received from the electrical busses are performed simultaneously in a dual source mode.

Example 33

The method of any combination of examples 30-32, wherein the plurality of power units comprises at least a first power unit and a second power unit, and wherein outputting the electrical energy comprises: outputting, at a first time and by the first power unit, a first amount of electrical energy via the one or more electrical busses; and outputting, at the first time and by the second power unit, the first amount of electrical energy via the one or more electrical busses.

Example 34

The method of any combination of examples 30-33, wherein outputting the electrical energy comprises: outputting, at a second time that is different than the first time and by the first power unit, a second amount of electrical energy via the one or more electrical busses; and outputting, at the second time and by the second power unit, a third amount of electrical energy via the one or more electrical busses, wherein the third amount of electrical energy is different than the second amount of electrical energy.

Example 35

The method of any combination of examples 30-34, wherein pairs of the propulsors and the electrical machines each comprise respective series propulsion units, the method further comprising: driving, by one or more combustion motors that are not included in the series propulsion units, one or more propulsors that are not included in the series propulsion units.

Example 36

An airframe comprising: a plurality of power units configured to output electrical energy onto one or more electrical busses; one or more propulsors; and one or more electrical machines, each respective electrical machine configured to drive a respective propulsor of the one or more propulsors using electrical energy received from at least one of the one or more electrical busses.

Example 37

The airframe of example 36, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 38

The airframe of example 37, wherein pairs of the propulsors and the electrical machines each comprise respective series propulsion units, the airframe further comprising: one or more parallel propulsion units.

Example 39

The airframe of example 36, wherein the airframe does not include an electrical energy storage system configured to provide electrical energy to the plurality of electrical machines for driving the propulsors.

Example 40

The airframe of any combination of examples 36-39, wherein the one or more power units comprise a plurality of power units.

Example 41

An aircraft propulsion system comprising: one or more parallel propulsion units, each of the parallel propulsion units comprising: a propulsor of a first set of propulsors; a gas turbine engine configured to drive the propulsor; and an electrical machine selectively configurable to: generate, for output via one or more electrical busses, electrical energy using mechanical energy derived from the propulsor or the gas turbine engine; and drive the propulsor of the first set of propulsors using electrical energy received via the one or more electrical busses; and one or more series propulsion units, each of the series propulsion units comprising: a propulsor of a second set of propulsors; and an electrical machine selectively configurable to: generate, for output via the one or more electrical busses, electrical energy using mechanical energy derived from the propulsor or the gas turbine engine; and drive the propulsor of the second set of propulsors using electrical energy received from one or more electrical busses.

Example 42

The system of example 41, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 43

The system of any combination of examples 40-42, further comprising: one or more power units configured to generate and output electrical energy via at least one of the one or more electrical busses.

Example 44

The system of any combination of examples 40-43, wherein each of the power units, the parallel propulsion units, and the series propulsion units are independently controllable.

Example 45

The system of any combination of examples 40-44, wherein the one or more parallel propulsion units includes only a single parallel propulsion unit and the one or more series propulsion units include a plurality of series propulsion units.

Example 46

The system of example 45, wherein the single parallel propulsion unit is positioned on a centerline of the aircraft, and wherein the plurality of series propulsion units are positionally mirrored across the centerline of the aircraft.

Example 47

A method of propelling an aircraft, the method comprising: driving, by one or more parallel propulsion units of the aircraft, one or more propulsors of a first set of propulsors; outputting, by the one or more parallel propulsion units of the aircraft, electrical energy onto one or more electrical busses; and driving, by one or more series propulsion units of the aircraft and using electrical energy received via the one or more electrical busses, one or more propulsors of a second set of propulsors that is different than the first set of propulsors.

Example 48

The method of example 47, further comprising: outputting, by one or more power units, electrical energy onto the one or more electrical busses.

Example 49

The method of example 48, further comprising: operating the aircraft in a dual source mode by at least simultaneously driving the one or more propulsors of the first set of propulsors, outputting electrical energy by the one or more power units, and driving the one or more propulsors of the second set of propulsors.

Example 50

The method of example 49, further comprising: charging, by an electrical storage system of the aircraft, using electrical energy sourced via the at least one of the one or more electrical busses; and discharging, by the electrical storage system, to provide electrical energy to the at least one of the one or more electrical busses.

Example 51

The method of example 50, further comprising: operating the aircraft in a triple source mode by at least simultaneously driving the one or more propulsors of the first set of propulsors, outputting electrical energy by the one or more power units, discharging the electrical storage system, and driving the one or more propulsors of the second set of propulsors.

Example 52

The method of any combination of examples 47-51, further comprising: operating the aircraft in an electric-only mode by at least simultaneously driving the one or more propulsors of the first set of propulsors, driving the one or more propulsors of the second set of propulsors, and causing the parallel propulsion units to refrain from burning fuel.

Example 53

An aircraft propulsion system comprising: one or more parallel propulsion units, each of the parallel propulsion units comprising: a propulsor of a first set of propulsors; a gas turbine engine configured to drive the propulsor; and an electrical machine selectively configurable to: generate, for output via one or more electrical busses, electrical energy using mechanical energy derived from the propulsor or the gas turbine engine; and drive the propulsor of the first set of propulsors using electrical energy received via the one or more electrical busses; and one or more series propulsion units, each of the series propulsion units comprising: a propulsor of a second set of propulsors; and an electrical machine selectively configurable to: generate, for output via the one or more electrical busses, electrical energy using mechanical energy derived from the propulsor or the gas turbine engine; and drive the propulsor of the second set of propulsors using electrical energy received from one or more electrical busses.

Example 54

The system of example 53, further comprising one or more electrical energy storage devices operably coupled to at least one of the one or more electrical busses, wherein the electrical energy storage devices are configured to both: charge using electrical energy sourced via the at least one of the one or more electrical busses; and discharge to provide electrical energy to the at least one of the one or more electrical busses.

Example 55

The system of any combination of examples 53-54, further comprising: one or more power units configured to generate and output electrical energy via at least one of the one or more electrical busses.

Example 56

The system of any combination of examples 53-55, further comprising: one or more controllers configured to operate the aircraft in a dual source mode by at least simultaneously causing the parallel propulsion units to drive the first set of propulsors using fuel, causing the power units to output electrical energy via the one or more electrical busses, causing the electrical storage system to discharge to output electrical energy via the one or more electrical busses, and causing the series propulsion units to drive the second set of propulsors using electrical energy received via the one or more electrical busses.

Example 57

The system of any combination of examples 53-56, further comprising: one or more controllers configured to operate the aircraft in a dual source electric-only mode by at least simultaneously causing the parallel propulsion units to drive the first set of propulsors using electrical energy received via the one or more electrical busses without the gas turbine engines using fuel, causing the power units to output electrical energy via the one or more electrical busses, causing the electrical storage system to discharge to output electrical energy via the one or more electrical busses, and causing the series propulsion units to drive the second set of propulsors using electrical energy received via the one or more electrical busses.

Example 58

The system of any combination of examples 53-57, wherein each of the power units, the parallel propulsion units, and the series propulsion units are independently controllable.

Example 59

The system of any combination of examples 53-58, wherein the one or more parallel propulsion units includes only a single parallel propulsion unit and the one or more series propulsion units include a plurality of series propulsion units.

Example 60

The system of example 59, wherein the single parallel propulsion unit is positioned on a centerline of the aircraft, and wherein the plurality of series propulsion units are positionally mirrored across the centerline of the aircraft.

Example 61

An aircraft propulsion system comprising: a plurality of electrical busses comprising a propulsion bus, a critical bus, and a non-critical bus; an electrical energy storage system coupled to each of the plurality of electrical busses; one or more power units configured to generate and output electrical energy via the propulsion bus; one or more electrical machines configured to drive respective propulsors using electrical energy received via the propulsion bus; one or more hotel loads configured to receive energy via the non-critical bus; and one or more critical loads configured to receive energy via the critical bus.

Example 62

The system of example 61, wherein at least one of the electrical machines is included in a parallel propulsion module.

Example 63

The system of any combination of examples 61-62, wherein at least one of the electrical machines is included in a series propulsion module.

Example 64

The system of any combination of examples 61-63, wherein the electrical energy storage system includes an interface for receiving electrical energy from an electrical energy source external to the aircraft.

Example 65

The system of example 64, wherein the interface is further configured to provide electrical energy to a load external to the aircraft.

Example 66

The system of any combination of examples 61-65, wherein the propulsion bus comprises a relatively high voltage direct current (DC) bus, and the critical and non-critical busses comprise relatively low voltage DC busses.

Example 67

The system of any combination of examples 61-66, wherein the propulsion bus includes a propulsion power panel.

Example 68

A method comprising: outputting, by one or more power units, electrical energy via a propulsion electrical bus; driving, by one or more electrical machines, respective propulsors using electrical energy received via the propulsion electrical bus; outputting, by an electrical energy storage system, electrical energy via a non-critical electrical bus and a critical electrical bus; receiving, by one or more hotel loads, electrical energy via the non-critical electrical bus; and receiving, by one or more critical loads, electrical energy via the critical electrical bus.

Example 69

The method of example 68, further comprising: outputting, by the electrical energy storage system, electrical energy via the propulsion electrical bus.

Example 70

The method of example 69, further comprising: charging, by the electrical energy storage system, using electrical energy received via the propulsion electrical bus.

Example 71

The method of any combination of examples 68-70, further comprising: outputting, by one or more parallel propulsion units, electrical energy via the propulsion electrical bus.

Example 72

The method of example 71, wherein driving the propulsors comprises: driving, by electrical machines included in the parallel propulsion units, propulsors of the parallel propulsion units using electrical energy received via the propulsion electrical bus.

Example 73

An airframe comprising: a plurality of electrical busses comprising a propulsion bus, a critical bus, and a non-critical bus; an electrical energy storage system coupled to each of the plurality of electrical busses; one or more power units configured to generate and output electrical energy via the propulsion bus; one or more electrical machines configured to drive respective propulsors using electrical energy received via the propulsion bus; one or more hotel loads configured to receive energy via the non-critical bus; and one or more critical loads configured to receive energy via the critical bus.

Example 74

The airframe of example 73, wherein at least one of the electrical machines is included in a parallel propulsion module.

Example 75

The airframe of any combination of examples 73-74, wherein at least one of the electrical machines is included in a series propulsion module.

Example 76

The airframe of any combination of examples 73-75, wherein the electrical energy storage system includes an interface for receiving electrical energy from an electrical energy source external to the airframe.

Example 77

The airframe of any combination of examples 73-76, wherein the interface is further configured to provide electrical energy to a load external to the airframe.

Example 78

The airframe of any combination of examples 73-77, wherein the propulsion bus comprises a relatively high voltage direct current (DC) bus, and the critical and non-critical busses comprise relatively low voltage DC busses.

Example 79

The airframe of any combination of examples 73-78, wherein the propulsion bus comprises a plurality of redundant propulsion busses.

Example 80

The airframe of any combination of examples 73-79, further comprising: a recuperator for at least one of the power units.

Example 81

A system or airframe comprising any combination of examples 1-9, 16-20, 21-29, 36-40, 41-46, 53-60, 61-67, and 73-80.

Example 82

A method comprising any combination of examples 10-15, 30-35, 47-52, and 68-72.

Example 83

A computer-readable storage medium storing instructions that, when executed, cause one or more controllers to perform the method of any combination of examples 10-15, 30-35, 47-52, and 68-72.

Various examples have been described. These and other examples are within the scope of the following claims.

What is claimed is:

1. An aircraft propulsion system comprising:
   one or more parallel propulsion units, each of the parallel propulsion units comprising:
      a propulsor of a first set of propulsors;
      a gas turbine engine configured to drive the propulsor; and
      an electrical machine selectively configurable to:
         generate, for output via one or more electrical busses, electrical energy using mechanical energy derived from the propulsor of the first set of propulsors or the gas turbine engine; and
         drive the propulsor of the first set of propulsors using electrical energy received via the one or more electrical busses;
   one or more series propulsion units, each of the series propulsion units comprising:
      a propulsor of a second set of propulsors; and
      an electrical machine selectively configurable to:
         generate, for output via the one or more electrical busses, electrical energy using mechanical energy derived from the propulsor of the second set of propulsors; and
         drive the propulsor of the second set of propulsors using electrical energy received from the one or more electrical busses;
   one or more power units configured to generate and output electrical energy via at least one of the one or more electrical busses; and
   one or more electronic controllers programmed to operate in a dual source mode by at least simultaneously causing the one or more parallel propulsion units to drive the first set of propulsors using fuel, causing the one or more power units to output electrical energy via the one or more electrical busses, causing the electrical storage system to discharge to output electrical energy via the one or more electrical busses, and causing the one or more series propulsion units to drive the second set of propulsors using electrical energy received via the one or more electrical busses.

2. The system of claim 1, further comprising one or more electrical energy storage devices operably coupled to at least one of the one or more electrical busses, wherein the one or more electrical energy storage devices are configured to both:
   charge using electrical energy sourced via the at least one of the one or more electrical busses; and
   discharge to provide electrical energy to the at least one of the one or more electrical busses.

3. The system of claim 1, wherein each of the one or more power units, the one or more parallel propulsion units, and the one or more series propulsion units are independently controllable.

4. The system of claim 1, wherein the one or more parallel propulsion units includes only a single parallel propulsion unit and the one or more series propulsion units include a plurality of series propulsion units.

5. A method of propelling an aircraft using an aircraft propulsion system, the aircraft propulsion system comprising:
   one or more parallel propulsion units, each of the parallel propulsion units comprising:
      a propulsor of a first set of propulsors;
      a gas turbine engine configured to drive the propulsor; and an electrical machine selectively configurable to:
   generate, for output via one or more electrical busses, electrical energy using mechanical energy derived from the propulsor of the first set of propulsors or the gas turbine engine; and
   drive the propulsor of the first set of propulsors using electrical energy received via the one or more electrical busses;
one or more series propulsion units, each of the series propulsion units comprising:
   a propulsor of a second set of propulsors; and
   an electrical machine selectively configurable to:
      generate, for output via the one or more electrical busses, electrical energy using mechanical energy derived from the propulsor of the second set of propulsors; and
      drive the propulsor of the second set of propulsors using electrical energy received from the one or more electrical busses;
one or more power units configured to generate and output electrical energy via at least one of the one or more electrical busses; and
one or more electronic controllers programmed to operate in a dual source mode by at least simultaneously causing the one or more parallel propulsion units to drive the first set of propulsors using fuel, causing the one or more power units to output electrical energy via the one or more electrical busses, causing the electrical storage system to discharge to output electrical energy via the one or more electrical busses, and causing the one or more series propulsion units to drive the second set of propulsors using electrical energy received via the one or more electrical busses;
the method comprising:
   driving, by the one or more parallel propulsion units of the aircraft, the one or more propulsors of the first set of propulsors;
   outputting, by the one or more parallel propulsion units of the aircraft, electrical energy onto the one or more electrical busses; and
   driving, by the one or more series propulsion units of the aircraft and using electrical energy received via the one or more electrical busses, the one or more propulsors of the second set of propulsors that is different than the first set of propulsors.

6. The method of claim 5, further comprising:
outputting, by one or more power units, electrical energy onto the one or more electrical busses.

7. The method of claim 6, further comprising:
operating the aircraft in the dual source mode by at least simultaneously driving the one or more propulsors of the first set of propulsors, outputting electrical energy by the one or more power units, and driving the one or more propulsors of the second set of propulsors.

8. The method of claim 7, further comprising:
charging an electrical storage system of the aircraft using electrical energy sourced via at least one of the one or more electrical busses; and
discharging the electrical storage system to provide electrical energy to the at least one of the one or more electrical busses.

9. The method of claim 8, further comprising:
operating the aircraft in a triple source mode by at least simultaneously driving the one or more propulsors of the first set of propulsors, outputting electrical energy by the one or more power units, discharging the electrical storage system, and driving the one or more propulsors of the second set of propulsors.

10. The method of claim 8, further comprising:
operating the aircraft in an electric-only mode by at least simultaneously driving the one or more propulsors of the first set of propulsors, driving the one or more propulsors of the second set of propulsors, and causing the one or more parallel propulsion units to refrain from burning fuel.

11. An aircraft propulsion system comprising:
one or more parallel propulsion units, each of the parallel propulsion units comprising:
   a propulsor of a first set of propulsors;
   a gas turbine engine configured to drive the propulsor; and
   an electrical machine selectively configurable to:
      generate, for output via one or more electrical busses, electrical energy using mechanical energy derived from the propulsor of the first set of propulsors or the gas turbine engine; and
      drive the propulsor of the first set of propulsors using electrical energy received via the one or more electrical busses;
one or more series propulsion units, each of the series propulsion units comprising:
   a propulsor of a second set of propulsors; and
   an electrical machine selectively configurable to:
      generate, for output via the one or more electrical busses, electrical energy using mechanical energy derived from the propulsor of the second set of propulsors; and
      drive the propulsor of the second set of propulsors using electrical energy received from the one or more electrical busses;
one or more power units configured to generate and output electrical energy via at least one of the one or more electrical busses; and
one or more power units configured to generate and output electrical energy via at least one of the one or more electrical busses; and
one or more electronic controllers programmed to operate in a dual source electric-only mode by at least simultaneously causing the parallel propulsion units to drive the first set of propulsors using electrical energy received via the one or more electrical busses without each gas turbine engine of the one or more parallel propulsion units using fuel, causing the power units to output electrical energy via the one or more electrical busses, causing the electrical storage system to discharge to output electrical energy via the one or more electrical busses, and causing the series propulsion units to drive the second set of propulsors using electrical energy received via the one or more electrical busses.

12. The system of claim 11, further comprising one or more electrical energy storage devices operably coupled to at least one of the one or more electrical busses, wherein the one or more electrical energy storage devices are configured to both:
   charge using electrical energy sourced via the at least one of the one or more electrical busses; and
   discharge to provide electrical energy to the at least one of the one or more electrical busses.

13. The system of claim 11, wherein each of the one or more power units, the one or more parallel propulsion units, and the one or more series propulsion units are independently controllable.

14. The system of claim 11, wherein the one or more parallel propulsion units includes only a single parallel propulsion unit and the one or more series propulsion units include a plurality of series propulsion units.

* * * * *